(12) United States Patent
Ische et al.

(10) Patent No.: US 8,665,156 B2
(45) Date of Patent: Mar. 4, 2014

(54) POSITION ESTIMATION ASSISTANCE INFORMATION FOR MOBILE STATION

(75) Inventors: Marc A. Ische, San Diego, CA (US); Dominic Gerard Farmer, Los Gatos, CA (US); Mark L. Moeglein, Ashland, OR (US); Zoltan F. Biacs, San Mateo, CA (US); Jignesh U. Doshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/555,735

(22) Filed: Sep. 8, 2009

(65) Prior Publication Data

US 2011/0057836 A1  Mar. 10, 2011

(51) Int. Cl.
*G01S 3/02* (2006.01)
*G01S 19/06* (2010.01)
*G01S 19/44* (2010.01)
*G01S 19/47* (2010.01)
*G01S 19/49* (2010.01)

(52) U.S. Cl.
USPC .................. 342/464; 342/357.28; 342/357.3; 342/357.32; 342/357.43

(58) Field of Classification Search
USPC ........ 342/464, 357.43, 357.28, 357.3, 357.32
See application file for complete search history.

(56) References Cited

U.S. PATENT DOCUMENTS

| | | | |
|---|---|---|---|
| 6,058,338 A | 5/2000 | Agashe et al. | |
| 6,313,787 B1 | 11/2001 | King et al. | |
| 6,433,734 B1 | 8/2002 | Krasner | |
| 6,556,832 B1 | 4/2003 | Soliman | |
| 6,768,448 B2 | 7/2004 | Farmer | |
| 6,861,980 B1 | 3/2005 | Rowitch et al. | |
| 7,123,938 B2 | 10/2006 | Koga et al. | |
| 7,127,257 B2 | 10/2006 | Riley et al. | |
| 7,136,652 B2 | 11/2006 | Riley et al. | |
| 7,139,765 B1 | 11/2006 | Balkany | |
| 7,302,261 B2 | 11/2007 | Rajkotia et al. | |
| 7,376,430 B2 * | 5/2008 | Matsuda | 455/456.2 |
| 7,495,608 B1 | 2/2009 | Chen et al. | |
| 7,512,180 B2 | 3/2009 | Florencio | |
| 7,616,157 B2 * | 11/2009 | Zhou | 342/464 |
| 7,747,257 B2 | 6/2010 | Zhao et al. | |
| 7,847,727 B2 * | 12/2010 | Hensley et al. | 342/357.32 |
| 7,916,072 B2 * | 3/2011 | Corazza et al. | 342/357.43 |
| 7,973,708 B2 * | 7/2011 | Lee et al. | 342/357.42 |
| 2002/0136176 A1 | 9/2002 | Abeta et al. | |

(Continued)

FOREIGN PATENT DOCUMENTS

| | | |
|---|---|---|
| CN | 1343408 A | 4/2002 |
| CN | 1346569 A | 4/2002 |
| CN | 1363158 A | 8/2002 |

(Continued)

OTHER PUBLICATIONS

International Search Report and Written Opinion—PCT/US2010/045979—International Search Authority, European Patent Office, Dec. 17, 2010.

(Continued)

*Primary Examiner* — Jack W Keith
*Assistant Examiner* — Frank J McGue
(74) *Attorney, Agent, or Firm* — Thien T. Nguyen

(57) ABSTRACT

The subject matter disclosed herein relates to providing assistance information to a mobile station for performing position estimation operations.

48 Claims, 12 Drawing Sheets

(56) References Cited

U.S. PATENT DOCUMENTS

| | | |
|---|---|---|
| 2002/0159470 A1 | 10/2002 | Atarashi et al. |
| 2003/0006931 A1* | 1/2003 | Mages .................... 342/357.06 |
| 2003/0043069 A1 | 3/2003 | Shamoto et al. |
| 2003/0050077 A1 | 3/2003 | Takeuchi et al. |
| 2003/0125044 A1 | 7/2003 | Deloach, Jr. et al. |
| 2003/0125045 A1 | 7/2003 | Riley et al. |
| 2004/0203853 A1 | 10/2004 | Sheynblat |
| 2004/0263386 A1 | 12/2004 | King et al. |
| 2005/0020309 A1 | 1/2005 | Moeglein et al. |
| 2005/0027789 A1 | 2/2005 | Luo et al. |
| 2005/0037775 A1 | 2/2005 | Moeglein et al. |
| 2005/0090266 A1 | 4/2005 | Sheynblat |
| 2005/0280576 A1* | 12/2005 | Shemesh et al. ........... 342/357.1 |
| 2006/0227045 A1 | 10/2006 | Sheynblat |
| 2007/0254717 A1 | 11/2007 | Yahagi |
| 2007/0273581 A1 | 11/2007 | Garrison et al. |
| 2008/0032706 A1 | 2/2008 | Sheynblat et al. |
| 2008/0270026 A1 | 10/2008 | Han |
| 2008/0316091 A1* | 12/2008 | Wigren et al. ........... 342/357.02 |
| 2009/0085806 A1 | 4/2009 | Piersol et al. |
| 2009/0088183 A1 | 4/2009 | Piersol et al. |
| 2009/0280775 A1 | 11/2009 | Moeglein et al. |
| 2010/0178934 A1 | 7/2010 | Moeglein et al. |
| 2011/0065457 A1 | 3/2011 | Moeglein et al. |
| 2013/0190007 A1 | 7/2013 | MOEGLEIN; Mark L. et al. |

FOREIGN PATENT DOCUMENTS

| | | | |
|---|---|---|---|
| CN | 1581993 | A | 2/2005 |
| JP | 7093361 | | 4/1995 |
| JP | 2003075526 | A | 3/2003 |
| JP | 2003078943 | A | 3/2003 |
| JP | 2009089396 | A | 4/2009 |
| KR | 10-2009-0000876 | * | 1/2009 |
| RU | 2297715 | C2 | 4/2007 |
| RU | 2319322 | C2 | 3/2008 |
| TW | 200525167 | A | 8/2005 |
| TW | 200718972 | | 5/2007 |
| TW | 1292829 | B | 1/2008 |
| WO | 0052930 | A1 | 9/2000 |
| WO | WO03058986 | A2 | 7/2003 |
| WO | WO 07025159 | | 3/2007 |

OTHER PUBLICATIONS

Biacs, et al.,"The Qualcomm/Snaptrack Wireless-Assited GPS Hybrid Positioning System and Results from Initial Commercial Deplyments" Proceedings of the Institute of Navistation (ION) GPS, XX, XX, Sep. 24, 2002, pp. 378-384, XP002325138.

Taiwan Search Report—TW099129278—TIPO—Sep. 6, 2013.

* cited by examiner

POSITION ESTIMATION ASSISTANCE INFORMATION FOR MOBILE STATION

BACKGROUND

1. Field

The subject matter disclosed herein relates to providing a mobile station with assistance information related to estimating a position for the mobile station.

2. Information

The position of a mobile station, such as a cellular telephone, may be estimated based on information gathered from various systems. One such system may comprise a Global Navigation Satellite System (GNSS), which is one example of a satellite positioning system (SPS). SPS systems such as GNSS may comprise a number of space vehicles (SV) orbiting the earth. Another example of a system that may provide a basis for estimating the position of a mobile station is a cellular communication system comprising a number of terrestrial base stations to support communications for a number of mobile stations. A further example of a system that may provide a basis for estimating the position of a mobile station is a wireless network compatible with the Institute of Electrical and Electronics Engineers (IEEE) 802.11 wireless local access network (WLAN) standard, which may also be referred to as a Wi-Fi network. Such a network may include access points and sensors, for example.

A position estimate, which may also be referred to as a position "fix", for a mobile station may be obtained based at least in part on distances or ranges measured from the mobile station to one or more transmitters, and also based at least in part on knowledge of the locations of the one or more transmitters. Such transmitters may comprise SVs in the case of an SPS and/or terrestrial base stations in the case of a cellular communications system and/or Wi-Fi/802.11x transmitters or similar beacon transmitters, for example.

An almanac may be maintained for systems used for position estimation. The almanac may contain various types of information, including, for example, information that may be used in position estimation operations. Such information may include the identities and locations of the various transmitters of the system, for example.

SUMMARY

In an aspect, a mobile station may determine additional fix information associated with an estimation of a position of the mobile station, and the additional fix information may include one or more measurements obtained from processing the one or more received wireless signals. Signals representative of at least a subset of the additional fix information may be transmitted into a network. Further, one or more signals representative of updated almanac information may be received from the network. The updated almanac information may be based, at least in part, on the subset of additional fix information.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
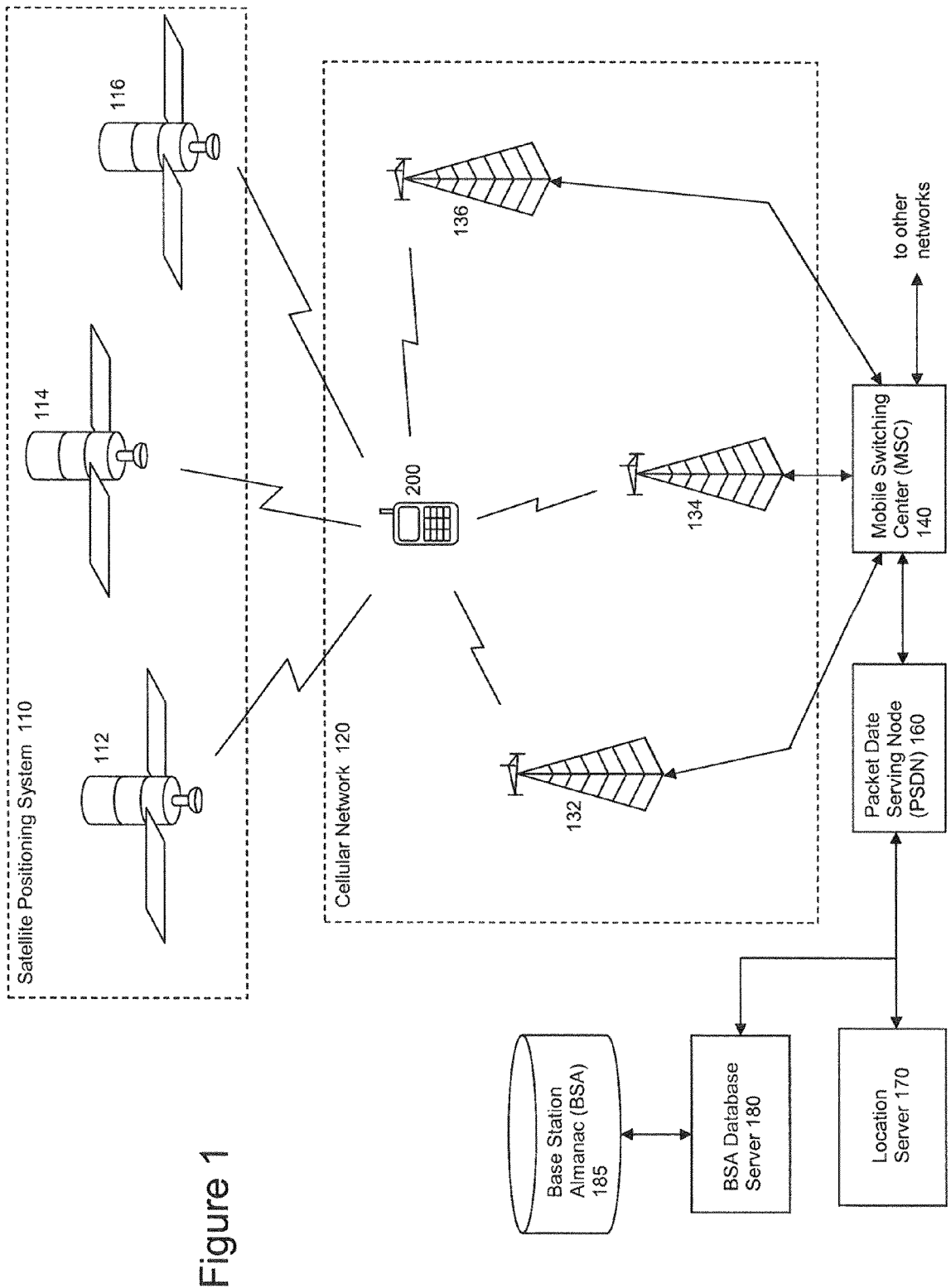
FIG. 1 is a schematic block diagram of an example global navigation satellite system (GNSS) and an example cellular network.

As discussed above, information organized in an almanac may be used in performing position estimation operations for a mobile station. A position estimate for a mobile station may be obtained at least in part from distances or ranges from the mobile station to one or more transmitters such as space vehicles (SV) and/or terrestrial base stations at known locations. As mentioned previously, an almanac may contain various types of information, including, for example, identities and locations of the various transmitters.

In another aspect, a mobile station may be provided with information related to one or more SVs that may enhance a time to first fix (TTFF) for the mobile station. For example, a mobile station may be provided with predicted orbital information for a number of SVs. In one particular implementation, such information may help the mobile station to narrow search windows for acquiring signals from one or more of the SVs, allowing quicker acquisition of such signals, for example. Additionally, a mobile station may be provided with timing information from an SPS to further enhance position estimation performance.

In one aspect, a mobile station may receive orbital and timing information from a network entity such as an assistance server. A number of mobile stations may provide information related to acquired signals from a variety of SVs and/or other beacon transmitters identified with unique identifiers or other characteristics to the assistance server, and the assistance server or some other network entity may utilize the gathered information to predict orbital patterns. These predictions may be broadcast to one or more mobile stations for the mobile stations to use in performing position estimation operations, often referred to as position fixes. As used herein, the terms "position estimation operation" and "position fix" are synonymous, and are used interchangeably.

In another aspect, a plurality of mobile stations may gather information related to wireless transmitters, which may be referred to herein as "base stations", as the mobile stations perform position fixes. Such information may be referred to as "fix information" and may comprise measurement information related to one or more signals received from one or more base stations and/or utilized in obtaining a position fix. Fix information may also comprise transmitter location information that may be broadcasted by at least some base stations. Fix information may further comprise information generated by one or more sensors of a mobile station. A mobile station may store information related to a number of position fixes, and such information may enhance the performance of future position fix operations for that particular mobile station. In an aspect, information gathered in the course of a position fix may be referred to a position fix information, or more simply as "fix information". Such fix information may be stored in a memory of a mobile station in what may be referred to as a "fix database" in which the fix information is organized and/or indexed according to particular instances of position fixes. Fix information may also be stored in a "cell database" in which fix information may be organized and/or indexed according to particular base stations observed and/or identified during position fix operations. In one example implementation, a mobile station may comprise one of a cell database and a fix database. In another example implementation, a mobile station may comprise both a cell database and a fix database. However, the scope of claimed subject matter is not limited to any particular count or type of databases capable of storing position fix information. Similarly, the scope of claimed subject matter is not limited to any particular organization and/or indexing of fix information.

In the course of operation of a mobile station, the mobile station may interact with a number of cells, whether the cells are actual serving cells or are non-serving cells. Signals received from such serving and non-serving cells may be used, in some cases, to perform position estimation operations, and measurement information gleaned from these operations may be stored in a fix database and/or a cell database for future reference in order to enhance the performance of future position fixes. In another aspect, some transmitters may broadcast their location, perhaps as part of a beacon signal in some cases. Information related to the positions of such transmitters may also be stored in fix databases and/or cell databases in the same manner as information gleaned from position estimation operations, even if the broadcasted transmitter location information is not used as part of position estimation operations. Also, as discussed previously, information from fix and/or cell databases may, in another aspect, be shared with other mobile stations so that such other mobile stations may take advantage of the obtained information.

In another aspect, a user of a mobile station may elect to allow the mobile station to transmit position fix information and/or broadcasted transmitter location information from a cell database and/or from a fix database to a central resource such as an assistance server in order to share the position fix information with other mobile stations. In return, in another aspect, the mobile station may receive position fix information gathered by other mobile stations. In an additional aspect, at least a portion of the gathered position fix information may be delivered to the mobile station in the format of a base station almanac, although the scope of claimed subject matter is not limited in this respect. In gathering position fix information, a number of mobile stations may provide information related to signals acquired from a variety of SVs and/or other stationary and mobile terrestrial beacon transmitters that may be identified via unique identifiers and/or characteristics. Further, as will be discussed below, fix information from transmitters located within buildings may be gathered by a number of mobile stations equipped with one or more sensors in order to update and/or maintain a transmitter information database such as a base station almanac, for example.

As previously mentioned, information related to various land-based transmitters of a wireless communication system may be stored in what may be referred to as a base station almanac (BSA). The term "base station almanac" as used herein is meant to include any organized set of information related to a plurality of transmitters of a wireless communication network. A base station almanac may be stored in a memory of a computing platform, such as an assistance server, for example, or in a memory of mobile station, for another example. In another aspect, base station almanac may be transmitted from an assistance server to one or more mobile stations. In a further aspect, a subset of a BSA stored at an assistance server may be transmitted to one or more mobile stations, and may further be referred to as base station almanac information. Such base station almanac information may comprise a "sparse" base station almanac in one aspect, or may comprise a regional base station almanac in another aspect. Of course, these are merely examples of base station almanac information that may be delivered from an assistance server to a mobile station, and the scope of claimed subject matter is not limited in this respect. Further, the scope of claimed subject matter is not limited to base stations. Rather, example implementations may include any transmitter of beacon signals that may be identified via unique identifiers or other characteristics. In another aspect, a base station almanac may be formed by gathering transmitter location information that may be broadcasted by individual base stations. Such an almanac may be updated as additional transmitter location information is received at one or more mobile stations and the mobile stations transmit such information to an assistance server maintaining the BSA, in an example implementation. The assistance server may aggregate transmitter location information received from the various mobile stations, and may transmit an updated BSA to one or more mobile stations, in an aspect.

In one aspect, a mobile station may use the received BSA information to perform position estimation operations, for example by trilateration using information and measurements from a number of transmitters. The mobile station may also use the received BSA information, in another aspect, to narrow a code phase search window for acquiring signals transmitted by an SPS in order to perform position estimation operations using, at least in part, measurements from signals received from one or more space vehicles (SV). For example, to narrow a search window, a mobile station may use base station almanac information to associate an identification of a sector currently serving the mobile station with a base station almanac entry. The entry may provide a location of the transmitter for the serving sector, from which an approximate location (within a couple of kilometers, for example) of the mobile station may be obtained.

Also, as previously mentioned, base station almanac information may further include fix information gathered by a number of mobile stations in performing position fix operations. An assistance server, a data manager, or other network entity may receive the position fix information gathered by the mobile stations and may determine which of the fix information to include in the base station almanac information to be delivered to a mobile station.

FIG. 1 is a schematic block diagram of an SPS 110 and a cellular network 120 in communication with a mobile station 200. Cellular network 120, for this example, may provide voice communication for a number of mobile stations including mobile station 200, for example, and may further support position estimation for the mobile stations in addition to providing voice communication. Cellular network 120 may comprise any of a number of cellular network types, several examples of which are described below. Cellular network 120 for this example comprises base stations 132, 134, and 136 that provide communication for a number of wireless terminals such as, for example, mobile station 200. For simplicity, only a few base stations 132, 134, and 136 are depicted and one mobile station 200 is depicted in FIG. 1. Of course, other examples may include additional numbers of base stations, and the configuration of base stations depicted in FIG. 1 is merely an example configuration. Also, cellular network 120 is merely an example wireless communications system, and the scope of claimed subject matter is not limited in this respect. Further, more than one type of wireless network may be utilized in one or more example wireless systems.

As used herein, the term "base station" is meant to include any wireless communication station and/or device installed at a fixed terrestrial location and/or movable and used to facilitate communication in a wireless communications system, such as, for example, a cellular network, although the scope of claimed subject matter is not limited in this respect. In another aspect, base stations may be included in any of a range of electronic device types. In an aspect, a base station may comprise a wireless local area network (WLAN) access point, for example. Such a WLAN may comprise an IEEE 802.11x network in an aspect, although the scope of claimed subject matter is not limited in this respect. WLAN access points may be relatively small in size, and may be easily moved by a user configuring a network. This is merely one example of a base station that may change position from time to time, or that may be mobile. It should be noted that the scope of claimed subject matter is further not limited to stationary base stations, but rather the scope of claimed subject matter may include any type of wireless signal transmitter, whether stationary or mobile. Further, in another aspect, position fix information may be determined from any type of beacon signal, including signals from visual technologies including cameras, information from sensors, and Bluetooth wireless signals, to name but a few examples.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions.

In an aspect, SPS 110 may comprise a number of SVs, for example SVs 112, 114, and 116. For an example, SPS 110 may comprise one or more satellite positioning systems, such as GPS, GLONASS and Galileo, or any other present or future GNSS, although the scope of claimed subject matter is not limited in this respect. In one or more aspects, mobile station 200 may receive signals from SVs 112, 114, and 116, and may communicate with one or more of base stations 132, 134, and 136. For example, mobile station 200 may obtain one or more measurements from one or more signals received from one or more of the SVs and/or base stations. However, in some circumstances timing signals from an SPS may not be available. In such a circumstance, mobile station 200 may gather propagation delay information through communication with one or more of base stations 132, 134, and/or 136. Mobile station 200 may calculate a position fix for the mobile station based, at least in part, on timing calibration parameters received through communication with one or more of base stations 132, 134, and/or 136, and further based, at least in part, on known position locations of the base stations. The mobile station may also make use of an estimated propagation delay for signals received from a base station source, a satellite source, or both.

In another aspect, position location determination calculations may be performed by a network entity such as, for example, location server 170 depicted in FIG. 1, rather than at mobile station 200. Such a calculation may be based, at least in part, on information gathered by mobile station 200 from one or more of base stations 132, 134, and/or 136. In a further aspect, location server 170 may transmit the calculated position location to mobile station 200.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example provides coordination and control for the base stations coupled to it and further controls the routing of data to/from the mobile stations served by these base stations. For the example depicted in FIG. 1, PDSN 160 may couple MSC 140 to location server 170 and to a BSA database server 180. Location server 170 may collect and format location data, may provide assistance to mobile stations for position estimation, and/or may perform computations to obtain position estimates for the mobile stations. BSA database server 180 manages a BSA database 185, which for this example stores a base station almanac for cellular network 110.

In one aspect, base station server 180 may provide BSA information to mobile station 200. Information to be included in the BSA provided to mobile station 200 may be a subset of BSA database 185 selected based at least in part upon any of a number of parameters. Of course, the amount of information provided to a mobile station may be limited due to storage capacity issues of the mobile station. In an aspect, base station almanac information delivered to mobile station 200 may comprise a sparse base station almanac, although the scope of claimed subject matter is not limited in this respect.

By nature, a base station almanac such as BSA 185 may contain information that does not often change. However, in one aspect, cellular network 120 for this example may alert mobile station 200 that revised BSA information is available in the event cellular network 120 is modified in a way that warrants alerting the mobile station. Mobile station 200 may request revised BSA information at least in part in response to receiving such an alert from BSA database server 180. In one aspect, additional and/or new fix database information may be made available by way of the base station almanac, and the availability of such information may trigger, in one example, an alert to the mobile stations that revised BSA information is available.

Figure 2:
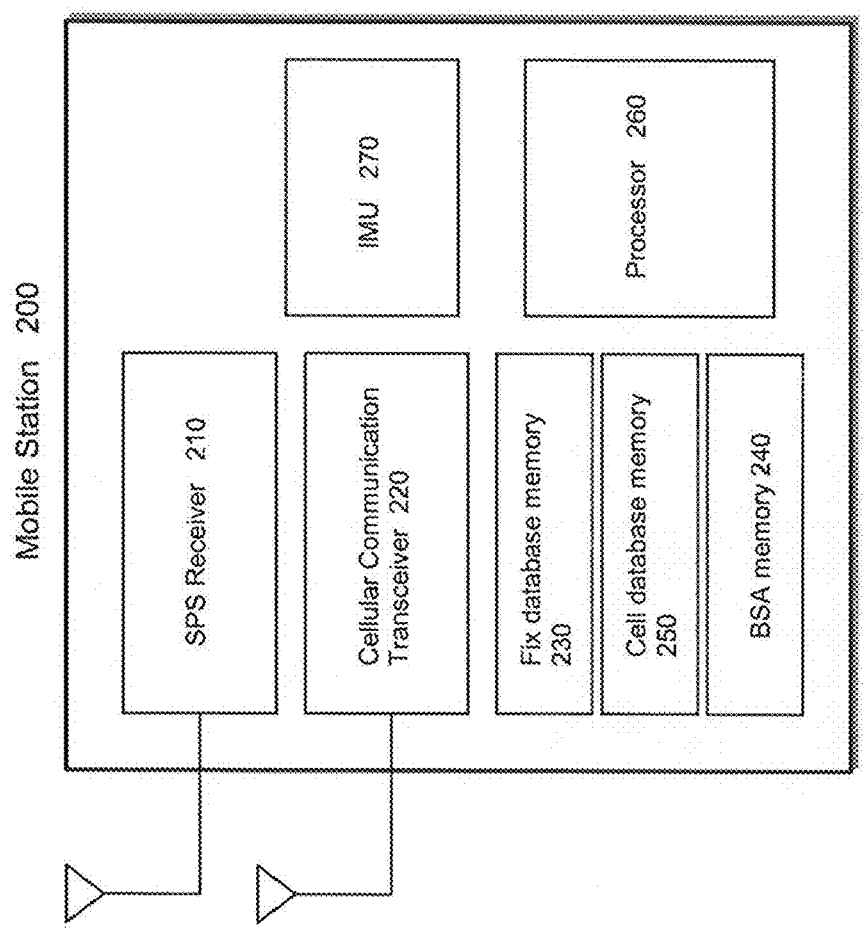
FIG. 2 is a schematic block diagram illustrating an example mobile station.

FIG. 2 is a schematic block diagram of an example implementation of mobile station 200. In an aspect, mobile station 200 comprises an SPS receiver 210 and a cellular communication receiver 220. Thus, mobile station 200 may communicate both with one or more SPS such as SPS 110 and one or more terrestrial wireless networks, such as cellular network 120. In another aspect, mobile station 200 may further comprise a memory device that is partitioned, in one example, to store position fix information in a fix database memory 230 and to store base station almanac information in a base station almanac storage area 240. In addition, for this example, the memory of mobile station 200 may be partitioned to store a cell database 250. In a further aspect, mobile station 200 may comprise one or more sensors that for this example are incorporated into Inertial Measurement Unit (IMU) 270. Mobile station 200 further comprises processor 260, for this example. Of course, this is merely one example of a configuration of a mobile station, and the scope of claimed subject matter is not limited in this respect.

In one example, a mobile station such as mobile station 200 may estimate its position based, at least in part, on timing information received from an SPS, and also based, at least in part, on signals received from SVs, such as satellites. In particular, such a device and/or system may obtain "pseudo-range" measurements comprising approximations of distances between associated satellites and a navigation satellite receiver. To estimate its position, a mobile station such as mobile station 200 may obtain pseudorange measurements to three or more satellites based upon transmissions from the satellites, as well as based on positions of the satellites at time of transmitting. A satellite's position at a point in time may be calculated based, at least in part, on the satellite's known or estimated orbital parameters. Mobile station 200 in another aspect may perform dead reckoning navigation operations based on sensor data to track the position of mobile station 200 in circumstances where mobile station 200 is not able to receive transmissions from SVs to perform position fixes.

Just as knowing an SV's orbital parameters and the SPS' timing information may allow a mobile station to estimate its position location, having accurate information, such as, for example, accurate position information, regarding base stations may also allow the mobile station to more quickly and accurately estimate its position. In an aspect, a mobile station may estimate its location based, at least in part, on signal propagation delay information gathered through communications with one or more base stations in a wireless network and further based, at least in part, on known position locations of the one or more base stations. As used herein, the term "propagation delay information" is meant to include any information related to propagation times for signals, such as between a mobile station and a base station. Such information may comprise round trip delay estimates, for example. Such information may further comprise, for another example, information related to an observed time difference of arrival for signals between different base stations and the mobile station, for example. For another example, such propagation delay information may comprise information related to downlink timing adjustments. However, these are merely examples of propagation delay information types, and the scope of claimed subject matter is not limited in these respects.

Further, as used herein, the term "known position location" as it relates to base stations in a wireless network is meant to include any information that may identify physical locations of the base stations. In one implementation, such known position location information for one or more base stations may be stored in a position determination entity in a wireless network, and/or may be stored in any of a wide range of other resources in the wireless network, as more fully described below. For an additional example, known position location information for one or more base stations may be stored in a mobile station. Further, for an example, known position location may comprise longitude and latitude, and may for another example comprise altitude information. However, these are merely examples of known position location, and the scope of claimed subject matter is not limited in this respect. In another aspect, some base stations may broadcast their locations, and such location information may be stored in one or more databases in the mobile station. Such base station location information may be shared with other network entities, such as an assistance server, for example. Further, in another aspect, the accuracy of the broadcasted location information for any particular base station may not be known. Techniques for estimating a location for the transmitting base station may be utilized to check the trustworthiness of the broadcasted information. For example, if a number of estimated locations for the base station are determined by a number of mobile stations, and the estimated locations largely correlate with the broadcasted location, the broadcasted location may be considered to be accurate.

Figure 3:
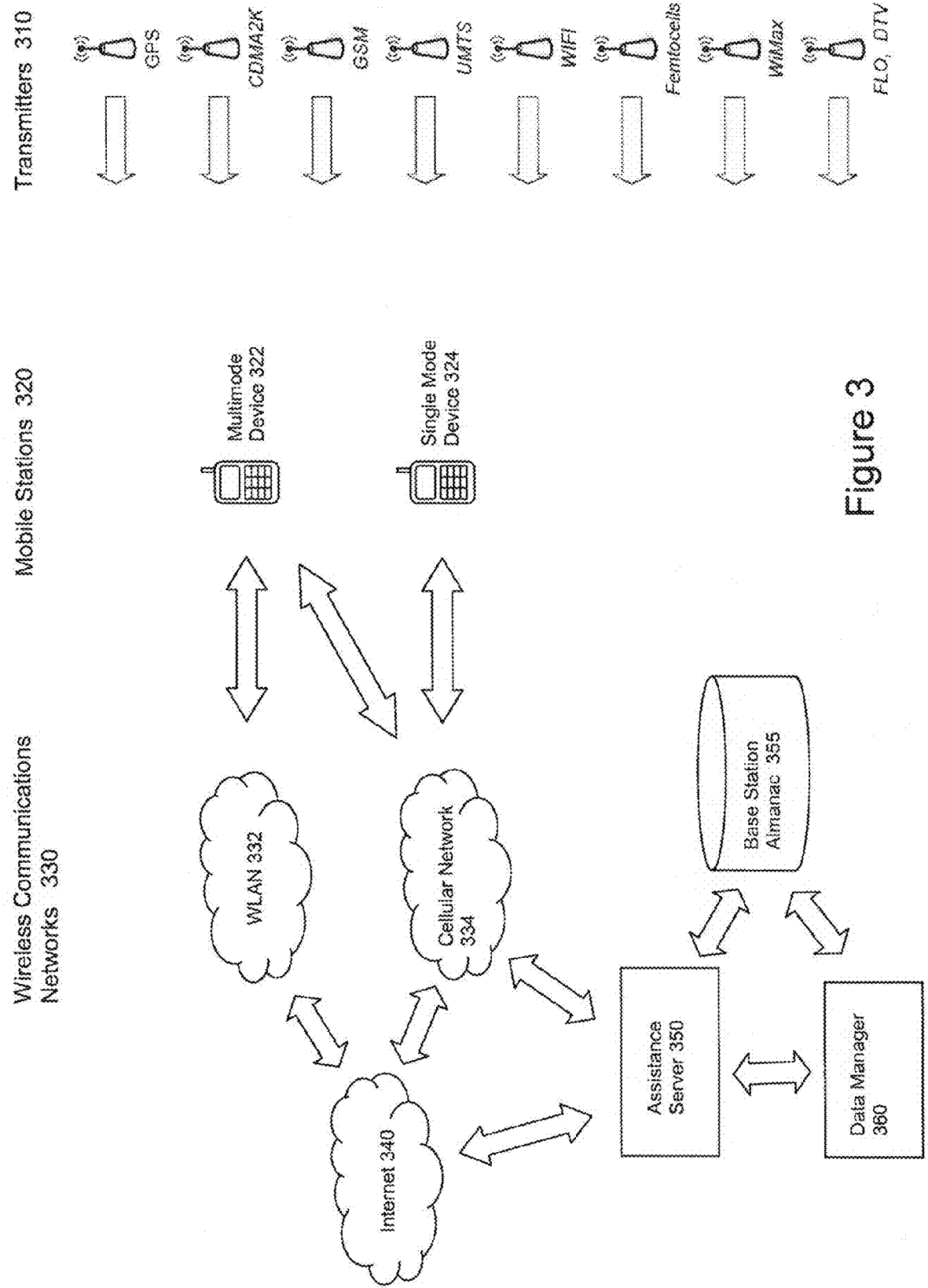
FIG. 3 is an illustration depicting an example base station almanac server in communication with a number of mobile stations via one or more wireless communication networks.

FIG. 3 is an illustration depicting an example assistance server 350 in communication with a number of mobile stations 320, labeled as mobile stations 322 and 324, via one or more wireless communication networks 332 and 334 and via Internet 340. For this example, mobile station 322 represents a multi-mode device capable of supporting communication with both a packet-switched wireless local area network (WLAN) 332 and a cellular network 334. Of course, these are merely examples of the types of wireless communications networks with which a multimode device may communicate, and the scope of claimed subject matter is not limited in this respect. Also for this example, mobile station 324 represents a single-mode device capable of supporting communication with cellular network 334. Again, the cellular network is merely one example of a wireless communication network with which a mobile station may establish communication.

FIG. 3 further depicts a number of transmitter types 310 that mobile stations 322 and 324 may monitor. Mobile stations 322 and 324 may or may not be subscribed to any given network associated with the various respective transmitter types 310 to be able to monitor signals transmitted from the various transmitter types 310. Therefore, BSA information provided to the mobile stations may or may not include information associated with networks to which the mobile stations are not subscribed. As mentioned previously, a mobile station may receive SPS orbital and/or timing information, and may further receive position fix information gathered from a number of other mobile stations. As previously mentioned, such position fix information gathered from a number of mobile stations may be combined and included in a base station almanac 355 by a network entity such as, for example, an assistance server 350 and/or a data manager 360.

The information in base station almanac 355 may comprise measurements and/or other information obtained from signals received from various base stations at one or more mobile stations such as mobile stations 322 and 324 during position fix operations. As previously mentioned, such position fix information may be stored in either a cell database or a fix database in a memory of a mobile station. In one or more example implementations, a mobile station may comprise both a cell database and a fix database, although the scope of claimed subject matter is not limited in this respect.

A fix database, for example, may comprise a number of entries, wherein the individual entries correspond to individual position fix operations performed by a mobile station at a point in time at a location. As is explained in more detail below, fix database entries may be assigned a fix score that may be used in determining which information to transmit to a mobile station or for a mobile station to determine whether to discard an entry of the fix database. In another aspect, a fix database may incorporate a first-in, first out priority scheme for storing fix database entries. For the first-in, first-out priority scheme, information from more recent position fixes are assigned priorities higher than for information from less recent position fixes. Of course, the first-in, first-out priority scheme is merely an example priority scheme, and the scope of claimed subject matter is not limited in this respect.

A cell database, for one example, may comprise a number of entries, wherein the individual entries correspond to individual base station transmitters and/or cells from which one or more signals are received by a mobile station in the course of performing position fix operations. Any of a number of techniques may be utilized in determining which information to store in the cell database and in determining which information to discard in the event that a maximum size for the cell database is reached. In one example, more recent entries may be given higher priority than less recent entries, although the scope of claimed subject matter is not limited in this respect.

For the example of FIG. 3, mobile stations 322 and 324 may request BSA information comprising at least a subset of a BSA database from assistance server 350. Mobile stations 322 and 324 may also receive fix information as part of the BSA information from assistance server 350. Assistance server 350 may further receive position fix information from cell and/or fix databases in mobile stations 322 and 324, wherein the information from the cell and/or fix databases are generated by mobile stations 322 and 324 in performing position fix operations. In another aspect, data manager 360 may periodically, or at some other regular or non-regular time period, consolidate information from various current network almanacs with mobile station-generated cell and/or fix databases. Also, data manager 360 may transmit consolidated fix information to assistance server 350. Data manager 360 may further provide updates to assistance server 350 with respect to fix information so that assistance server 350 can update base station almanacs intended for various mobile stations, and may make a determination as to whether the changes received from data manager 360 warrant a transmission of a new version of the databases. However, this is merely an example of how a data manager may interact with an assistance server, and the scope of claimed subject matter is not limited in this respect.

In another aspect, assistance server 350 may receive local cell and/or fix databases from mobile stations such as mobile stations 322 and 324. Assistance server 350 may pass the information received from the mobile stations to data manager 360. As previously mentioned, in an aspect, data manager 360 may consolidate information received from a variety of sources. For example, a number of mobile stations may store position fix information in their respective cell and/or fix databases, and may gather such information over a period of time. Data manager 360 may receive and combine this information from a number of sources to make adjustments according to confidence factors supplied with the fix information, in one example aspect. Types of position fix information that may be provided to assistance server 350 from mobile stations may include, but are not limited to, phase and/or timing relationships, measures of signal strength, residual errors from the mobile station's position, and/or clock bias estimates, to list but a few examples. Such information may come from data already available from the wireless modem for communications purposes, such as the information found in an IS-2000 Pilot Strength Measurement Message or messages with similar purposes for Universal Mobile Telecommunications System (UMTS) or Global System for Mobile communications (GSM) networks, for example. In another aspect, data manager 360 may implement algorithms to derive more accurate position fixes and to reduce uncertainty for cell information in a base station almanac.

Although FIG. 3 depicts a single assistance server 350, other example implementations are possible where separate upload and download servers are utilized. Also, in an aspect, data files for base station almanac information to be delivered to mobile stations may be separate in one example implementation from the files of SPS orbital information provided to mobile stations. In an alternate example implementation, base station almanac information and SPS orbital information may be provided to mobile stations as a combined data file, although the scope of claimed subject matter is not limited in this respect. Also, in an example, base station almanac information may be encrypted for transmission to the mobile stations to prevent unauthorized access to the information. Further, in another aspect, the uploading of fix information from mobile stations to assistance server 350 may be accomplished anonymously, so that a user can not be associated with the data included in the fix database. In an additional aspect, mobile stations that incorporate communication functions for WLAN networks such as Wi-Fi/802.11x may provide fix information to an assistance server and/or may receive information from the assistance server via the mobile station's data connectivity over the WLAN.

Although the example of FIG. 3 depicts two mobile stations, in practice a wide variety of mobile station types exhibiting a wide range of different functionalities and/or storage capabilities may be utilized to communicate with a large variety of potential network types. Further, the mobile stations may exhibit a wide range of different usage patterns. Therefore, it may be advantageous for BSA database server 350 to provide individualized subsets of BSA information that the individual mobile stations may require and/or request, and it may be further advantageous to provide such information formatted in a flexible manner according to a specified file size, coverage area, and/or transmitter type, to name but a few examples of parameters that may be specified. In one aspect, these parameters may be specified by the mobile stations.

In another aspect, once a mobile station has uploaded its fix and/or cell database to assistance server 350 and/or to data manager 360, the fix and/or cell database storage may be cleared, allowing the mobile station to begin collecting fix information anew, although the scope of claimed subject matter is not limited in this respect. Also, any of a wide range of air interfaces may be supported by the techniques described herein. For example, supported air interfaces may include, but are not limited to, Universal Mobile Telecommunications System (UMTS), Global System for Mobile communications (GSM), WiFi, 1x, Evolution Data-Optimized (EVDO), and Long Term Evolution (LTE). Mobile television air interfaces may also be supported, including but not limited to MFLO, Digital Video Broadcasting-Handheld (DVB-H), Terrestrial Digital Multimedia Broadcast (TDMB), Satellite Digital Multimedia Broadcasting (SDMB), etc. Similarly, the techniques described herein may utilized with Bluetooth systems, Terrestrial TV, FM and local transaction and/or payment sources. However, these are merely example communications systems that may be utilized with the example techniques described herein, and the scope of claimed subject matter is not limited in these respects.

For yet another example, the determination of whether to include information for a given group of transmitters in the base station almanac information to be provided to a mobile station may be made conditionally, based at least in part on an availability of storage space in the receiving mobile station. In one example, position fix information provided to mobile stations may comprise a file of about 50 kB, although the scope of claimed subject matter is not limited in this respect.

In some examples described herein, a mobile station such as mobile station 322 is described as requesting BSA information from an assistance server such as server 350. In response to receiving the request from mobile station 322, assistance server 350 may configure the appropriate information and deliver it to the mobile station. However, there may be a number of variations to these examples, in that there may be various techniques to communicate base station almanac information to mobile station 322. In some cases, the technique used may depend at least in part on the type of air interface. In some air interfaces, the transmitting entity may also be able to store and forward its own BSA information or that of its neighbors. For example, referring to FIG. 1, base station 132 may store BSA information, and may forward at least a portion of that BSA information to mobile station 200 upon receiving a request from mobile station 200. Base station 132 may compress and/or encrypt the information in an aspect. In another aspect, base station 132 may authenticate mobile station 200 before granting the mobile station's request for BSA information.

In an additional aspect, a mobile station may be expected to report a specified amount of information to an assistance server, for example, in exchange for more complete base station almanac information. Position fix information gathered and reported by the mobile station may comprise a series of locations along with respective location uncertainties, and may further comprise attributes of base stations observed and/or determined by the mobile station from those locations. Such observed and/or determined attributes might include base station identification information, for example, as well as position information, signal frequency, relative and/or absolute signal strength, color coding, slot timing, and/or any other pertinent information that may help the assistance server or other network entity to map the coverage area of the individual transmitters. The attributes may further include code phase for individual transmitters, and/or timing relationships between some standard timing source (such as SPS time) and the framing structure of one or more received signals. This information may be stored in a database internal to the mobile device. The database may be organized to store a list of positions and their associated measurements or it may be organized as an almanac of statistics for known transmitters and their respective identifiers, positions, and/or service areas.

Figure 4:
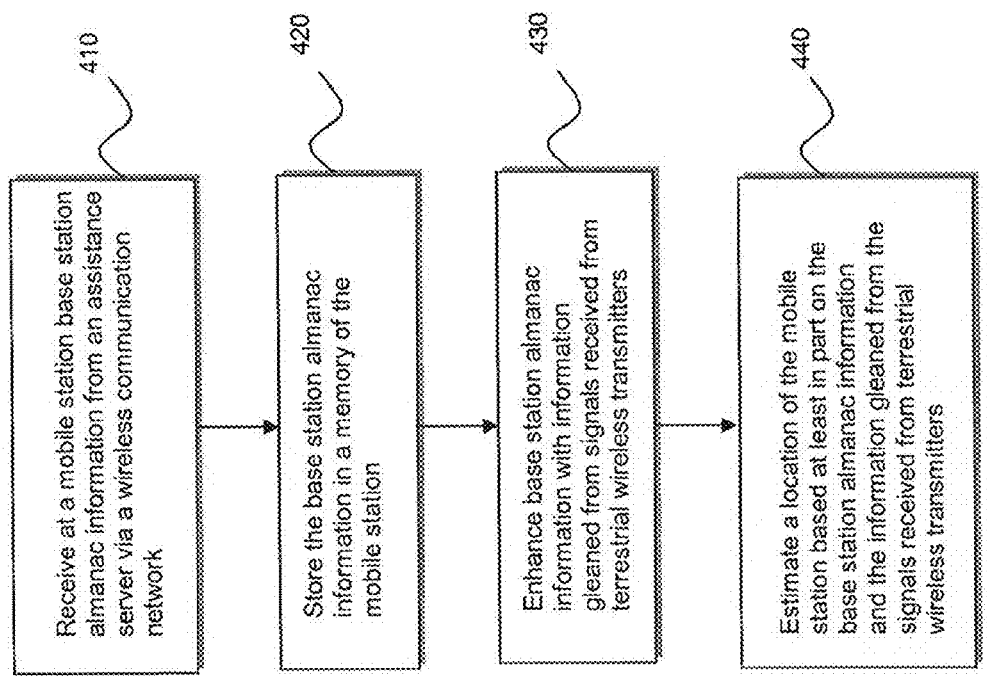
FIG. 4 is a flow diagram of an example process for estimating a position of a mobile station based at least in part on information from a base station almanac.

FIG. 4 is a flow diagram illustrating an example process for estimating a position of a mobile station based, at least in part, on enhanced base station almanac information. At block 410, a base station almanac may be received at a mobile station from a base station almanac server via a wireless communication network. At block 420, the received base station almanac may be stored in a memory of the mobile station. At block 430, the base station almanac stored in the mobile station may be enhanced with information gleaned from signals received at the mobile station from one or more base stations. As described above according to particular implementations, the stored base station almanac may be enhanced by adding information related to one or more position fix operations. In an aspect, information from one or more signals received at the mobile station from one or more base stations may be stored in a cell database and/or in a fix database. In one example, information stored in the cell database and/or fix database may be combined with or added to the base station almanac information at the mobile station to generate enhanced base station almanac information. At block 440, a location of the mobile station may be estimated based, at least in part, on information from the base station almanac, including the enhanced information. Other examples in accordance with claimed subject matter may include all, less than, or more than blocks 410-440. Further, the order of blocks 410-440 is merely an example order, and the scope of claimed subject matter is not limited in this respect.

Figure 5:
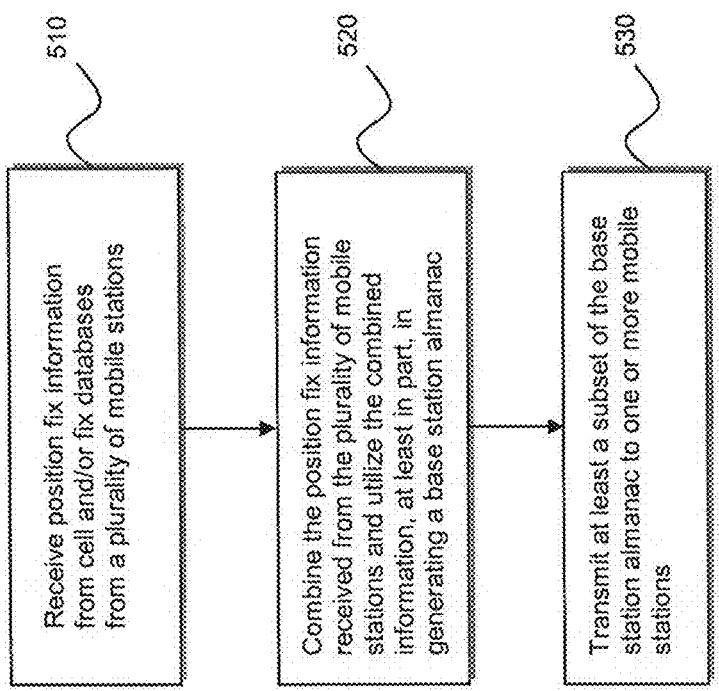
FIG. 5 is a flow diagram of an example process for estimating a plurality of positions of a mobile station and storing information related to the position estimations in a memory in the mobile station.

FIG. 5 is a flow diagram depicting an example process for sharing enhanced base station almanac information. At block 510, position fix information may be received from a plurality of mobile stations. As discussed above, such position fix information may be stored in fix databases or in cell databases in the memories of the mobile stations. In some cases, a mobile station may include both a fix database and a cell database. At block 520, the position fix information received from the plurality of mobile stations may be combined. The combined information may be utilized in generating a base station almanac. The inclusion of the position fix information received from the plurality of mobile stations may allow a network entity such as an assistance server to generate an enhanced base station almanac, in that the base station almanac may be more complete and/or more accurate. At block 530, at least a subset of the base station almanac may be transmitted to one or more mobile stations. In one example implementation, in order for a mobile station to receive the enhanced base station almanac information, the mobile station may be requested to provide position fix information. In this manner, position fix information gathered from a number of mobile stations may be shared with a number of other mobile stations. As mentioned, in one example implementation, the gathered information may be shared as part of a base station almanac. Of course, examples in accordance with claimed subject matter may include all, less than, or more than blocks 510-530. Further, the order of blocks 510-530 is merely an example order, and the scope of claimed subject matter is not limited in this respect.

Figure 6:
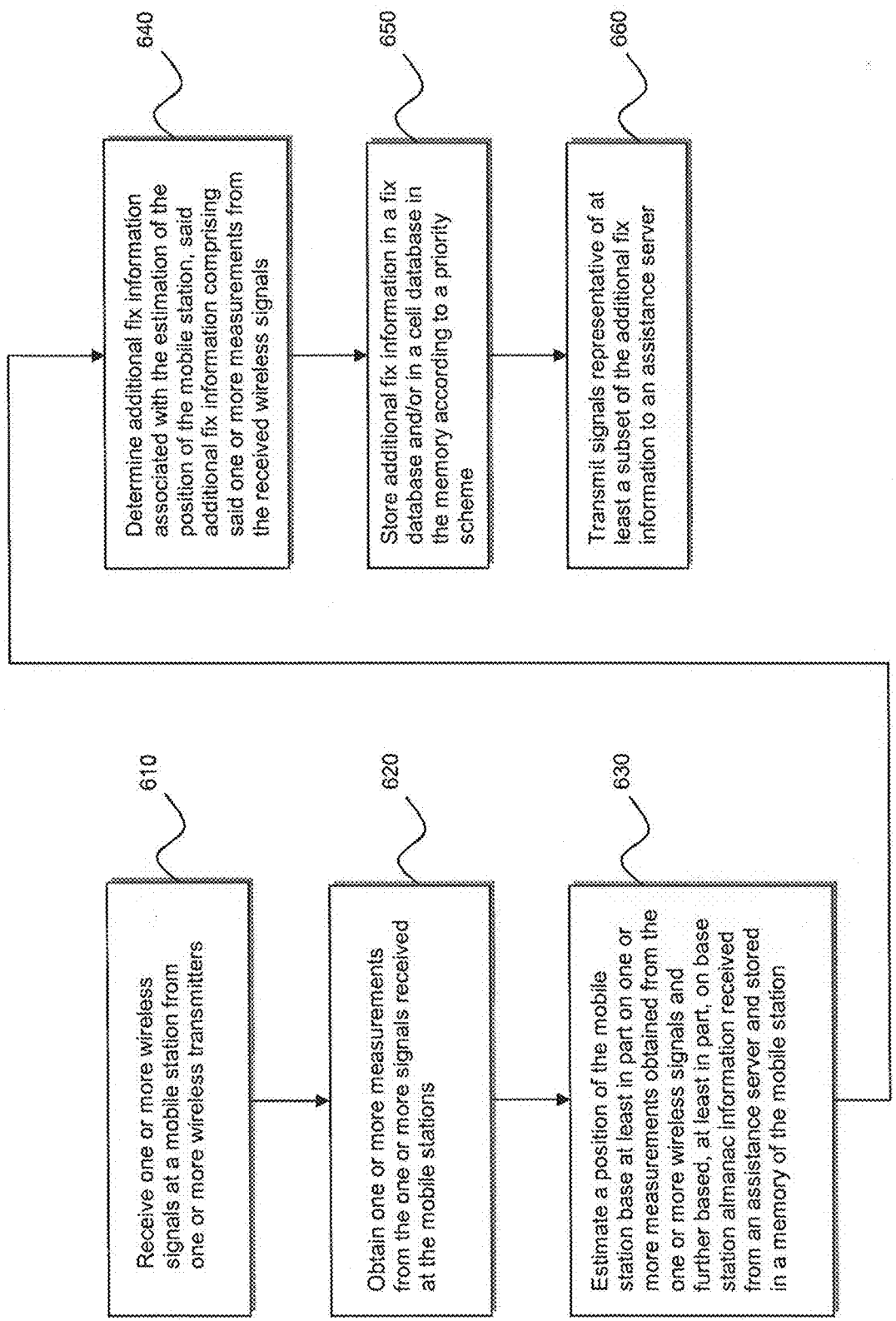
FIG. 6 is a flow diagram of an example process for estimating a plurality of positions of a mobile station and storing information related to the position estimations in a memory in the mobile station and transmitting at least a subset of the information to an assistance server.

FIG. 6 is an additional flow diagram. For this example, the flow diagram illustrates an example process for estimating a position of a mobile station and sharing fix information. At block 610, one or more wireless signals may be received at a mobile station from one or more base stations. For the present example, the mobile station may comprise a mobile station such as mobile station 200 depicted in FIG. 2, although the scope of claimed subject matter is not limited in this respect. At block 620, one or more measurements may be obtained from the one or more wireless signals received from the one or more base stations at block 610. At block 630, a position of the mobile station may be estimated at least in part on the one or more measurements obtained from the one or more received wireless signals. Such a position estimate may be further based, at least in part, on base station almanac information received from an assistance server. The base station almanac information may be stored in a memory of the mobile station. At block 640, additional fix information associated with the position estimate of the mobile station may be determined. In an aspect, the determined additional fix information may comprise the one or more measurements obtained from the respective one or more received wireless signals. In another aspect, the additional fix information may comprise one or more attributes related to the one or more base stations observed during the position fix described above. For example, the additional fix information may comprise phase and/or timing relationships, measures of signal strength, residual errors from the mobile's position and/or clock bias estimates, to list a few example types of information. At block 650, the additional fix information may be stored in the memory of the mobile station. In an aspect, the additional fix information may be stored in a cell database in the memory of the mobile station. In another aspect, the additional fix information may be stored in a fix database in the memory of the mobile station. In some cases, a mobile station may store both a cell database and a fix database in its memory, although the scope of claimed subject matter is not limited in this respect. As noted above, a cell database may comprise fix information organized and/or indexed according to particular base stations observed and/or identified during position fix operations. A fix database may comprise fix information that may be organized and/or indexed according to particular instances of position fixes. However, these are merely examples of how position fix information may be organized and/or indexed in a memory of a mobile station, and the scope of claimed subject matter is not limited in this respect.

In another aspect, a priority scheme may be used to determine whether to store the additional fix information, for example in situations where a maximum database size has been reached and where one or more database entries would need to be removed from the database in order to accommodate the additional information. For one example priority scheme, fix information related to more recent position fixes may be given a higher priority than fix information related to less recent position fixes. In such a case, the additional fix information determined at block 640 would be stored in the fix and/or cell database, and if a maximum database size would be exceeded with the inclusion of the additional fix information, fix information related to the least recent position fix represented in the database may be removed to make room for the additional fix information. Of course, this is merely an example priority scheme, and the scope of claimed subject matter is not limited in this respect. At block 660, signals representative of at least a subset of the additional fix information may be transmitted to an assistance server. In an aspect, an entire cell and/or fix database may be transmitted from the mobile device to the assistance server. In other examples, subsets of the information stored in the fix and/or cell database may be transmitted. Examples in accordance with claimed subject matter may include all, less than, or more than blocks 610-660. Further, the order of blocks 610-660 is merely an example order, and the scope of claimed subject matter is not limited in this respect.

As previously mentioned, as a mobile station obtains measurement information from wireless signals encountered from various transmitters, and/or as broadcasted transmitter locations are received from various transmitters, decisions may be made to decide which information to add to a fix database and/or a cell database that may have a specified maximum size due to limited storage capacity. For example, it may be advantageous to keep the size of a fix database at 50 kB or less, in one example implementation. Of course, this is merely an example storage capacity, and the scope of claimed subject matter is not limited in this respect. Of course, the size of the fix database and/or cell database may vary from implementation to implementation, as various mobile stations may vary in their capabilities and/or requirements. In one example implementation, a fix database may be at least large enough to hold information related to at least 256 fixes. In another aspect, a maximum number of fixes may also be specified. For example, a fix database may have a maximum of 1000 fixes, in one example implementation. Alternatively, as previously alluded to, the maximum may be expressed as a maximum file size, such as the previous example of 50 kB.

In another aspect, if a mobile station periodically receives predicted orbital information for an SPS system, base station almanac information may also be delivered at approximately the same time. In another aspect, the SPS information and the base station almanac information may comprise the same data file, although the scope of claimed subject matter is not limited in this respect. Possible advantages of integrating the SPS and base station almanac information downloads into a single download may be seen in terms of reducing the number of connection setups that may be required as well as centralizing the symbiotic relationship between uploads and downloads.

As previously mentioned, a priority scheme may be utilized to determine which fix information to store in a fix database in the event of limited storage capacity for the fix database. The limited storage capacity may be based, in one example, on a specified maximum file size. In another example, limited storage capacity may be due to a finite size of a memory device in a mobile station. In an aspect, fix information related to horizontal estimated position error (HEPE) may be relatively valuable information, as a fix with a lower error estimate may be given more weight than one with a higher error estimate, and therefore may be assigned a higher priority. Another type of possibly valuable fix information may comprise the number of transmitters of interest observed during a position fix operation. It may be more efficient to provide fix information for large numbers of transmitters referenced to a single position. Furthermore, in an interference-limited system, those fixes with a greater number of terrestrial measurements are likely to be closer to the edge of a transmitter's coverage area, thus helping to more effectively define the limits of a transmitter's service area.

In a further aspect, a higher weight in the priority scheme may be given to new transmitters, meaning transmitters for which little or no information is currently available. For example, if a mobile station has stored in its memory base station almanac information that does not include information related to a base station observed by the mobile station in the course of performing a position fix for the mobile station, the mobile station may assign a high priority to storing information related to this base station so that an assistance server or other network entity may incorporate information gleaned from the base station in a future version of a base station almanac. Similarly, relatively high weight may also be given to transmitters whose almanac information is not considered to be reliable, or where a confidence factor is below a threshold level. On the other hand, transmitters whose almanac information is considered to be reliable and/or accurately reported may be given a low priority in the priority scheme, since it may be less important to gather information related to transmitters whose almanac information is already accurately recorded. However, it is possible for almanac information to change, or for transmitter characteristics to change. Therefore, it may still be of value to gather information for such transmitters, although at a lower priority, for the present example.

For one example of a priority scheme for determining which fix information to store in a fix database, measurements related to particular position fixes may be assigned an "independence score". For measurements related to transmitters with highly accurate or reliable base station almanac information available such as, for example, an antenna location for a transmitter that is believed to be accurate within a specified margin of error, the independence score may be assigned a value of 0 for this example. If accurate or reliable almanac information is not available for the transmitter from which the measurements originate, the independence score for an associated measurement may be given according to the following:

$$\text{Independence Score} = (\Delta_P/\text{MAR}) * (\Delta_T/10 \text{ min}) \qquad (1)$$

wherein $\Delta_P$ comprises a smaller of a distance to a prior position fix and a distance to a following position fix, and wherein $\Delta_T$ comprises a shortest time between the fix associated with the additional fix information and the neighboring fixes. Of course, equation (1) is merely an example of how an independence score may be calculated, and the scope of claimed subject matter is not limited in this respect. In an aspect, a goal of the scoring techniques described herein may be to select a subset of fixes that may provide an independent view, both in time and in space, of the network. Therefore, the scoring technique may be useful in selecting the least independent fixes for removal from the list or database to make room for a new, more independent fix. In another example, the independence score may be calculated to maximize either temporal or spatial diversity. In one aspect, the emphasis may be shifted to give one of the two elements of temporal and spatial diversity more weight than the other. It may also be desirable, in a further aspect, to utilize different independence scoring techniques for different radio access types, or as an adaptation for different networks.

In a further aspect, and continuing the present example priority scheme, a "need score" is also determined for the fix measurements. This example scoring mechanism may be utilized to quantify the relative need for keeping one fix over another, based at least in part upon a current state of a base station almanac entry for a given measurement. The need score for this example may be based on the origins of the base station almanac, and/or a confidence in the almanac information. For the present example, if the base station almanac is provided by a trusted source, the need score for the particular fix measurement is assigned the integer value of 0. If a base station almanac entry associated with the transmitter that is the subject of the fix measurement under consideration is understood with relatively great statistical significance, the need score is assigned an integer value of 1, for this example. In the event the base station almanac information indicates a known coverage area, but more information is desired, the need score is assigned the integer value of 2. On the other hand, if the base station almanac information is labeled as unreliable or is absent altogether, the need score is assigned a value of 10.

For the present example, independence scores and need scores may be utilized to generate a fix score for particular entries of the fix database, and for any potential new addition to the fix database. In one aspect, the fix score may be calculated as follows:

Fix Score=sum(Independence Scores for all measurements associated with a particular fix)*sum(Need scores for all measurements associated with a particular fix)/HEPE        (2)

where HEPE is the horizontal estimated position error associated with the particular fix.

In another aspect, a fix score for a potential addition to the fix database may be compared with fix scores for entries already included in the fix database. In one example, if any of the fix scores in the fix database are lower than a fix score for candidate fix information entry, the candidate fix information entry may be added to the fix database and the database entry with the lowest fix score may be discarded. In another aspect, if a fix information entry is removed from a fix database to make room for a new fix information entry, the neighboring fix information entries of the removed fix information entry are linked and their fix scores may be recalculated. For one or more embodiments, fixes that are neighbors in time, or perhaps space, would have their fix scores updated. Further, as used herein, the term "linked" as it applies to fix information entries herein may imply an association between fixes, perhaps as in a linked list or a neighbor list which might be kept for each sector, for one example embodiment. However, it should be noted that the priority scheme described above is merely an example, and the scope of claimed subject matter is not limited in this respect. Other example implementations may use other schemes for determining which fix information to include in a fix database.

As previously mentioned, base station almanac information may be incomplete, in that the base station almanac may not have information related to the identity and/or location of at least some transmitters. Also, even if information for all transmitters is gathered at a point in time, many of such transmitters may not remain stationary, and much of the base station almanac information may become inaccurate and/or stale. One example situation of where a base station almanac may be more likely to lack accurate information is where a relatively large number of access points are located in the interior of one or more buildings. Such access points may be associated with WLAN networks, for example, although the scope of claimed subject matter is not limited in this respect. The large number of such access points may make it more difficult to gather identity and location information for those access points. Also, inside of a building, mobile stations may not receive SPS signals. Therefore, position location operations that utilize SPS signals may not be possible, making it more difficult to determine a position of an access point once such an access point is identified by a mobile station.

Because many access points may be located inside buildings where SPS service may not be available, alternative techniques for performing position fixes and for determining locations of access points encountered by a mobile station may be advantageous. For one or more example techniques, an altitude for an access point may be determined along with latitude and longitude. Determining an altitude for an access point may allow the access point to be associated with a particular floor of the building in which the access point resides. Such information may prove useful, for example, in emergency situations where first responders may utilize the information to locate fires and/or other emergency conditions on particular floors. Of course, floor information may be useful in a number of other ways, including aiding information technology personnel to locate particular access points when maintaining a network. Further, such altitude information may further help make future position fixes for mobile stations more accurate.

Figure 7:
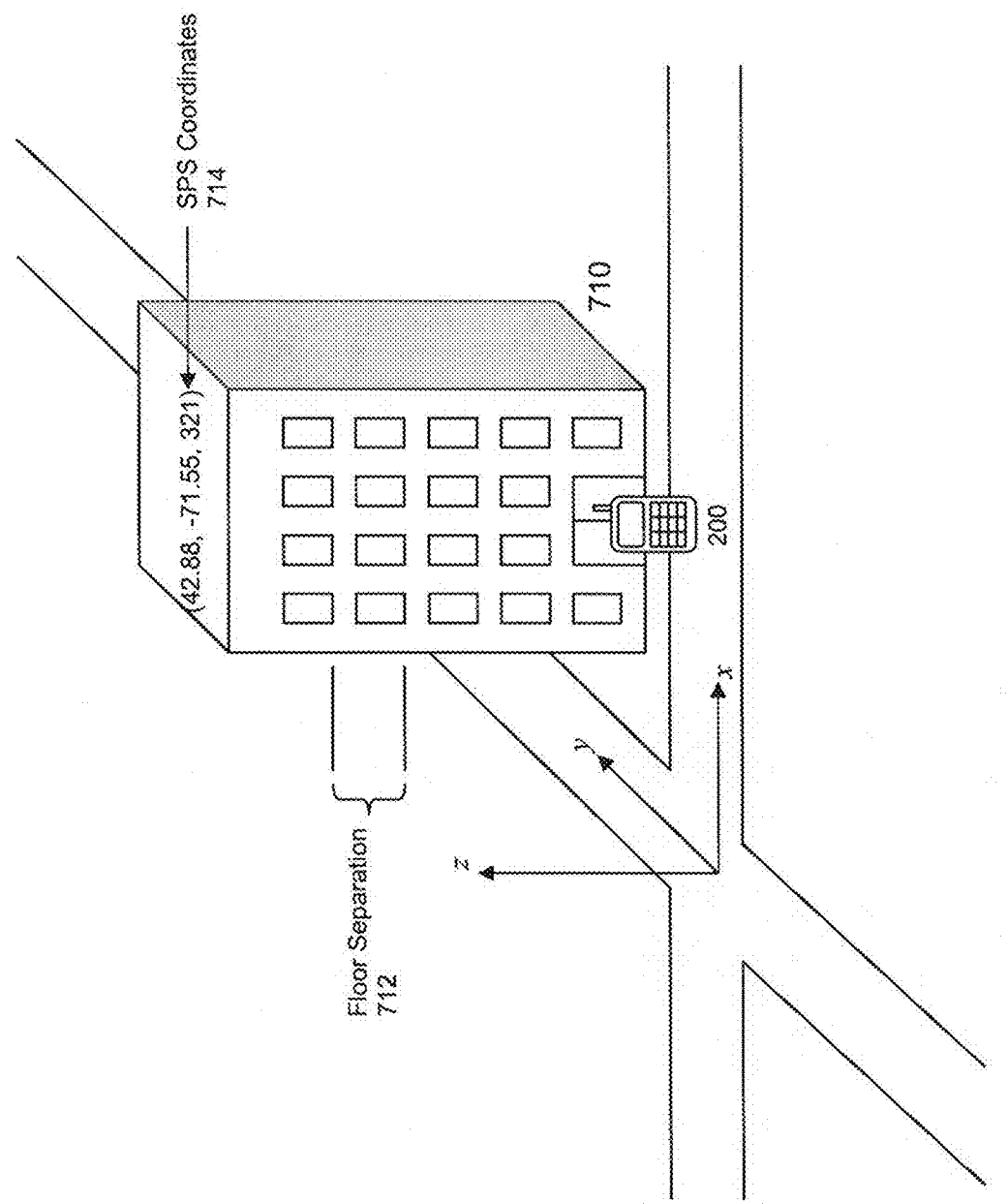
FIG. 7 is an illustration of a building having a location in an SPS coordinate system.

FIG. 7 is an illustration of a building 710 having a location 714 in an SPS coordinate system. For this example, building 710 has an estimated location of (42.88, −71.55, 321), presented as latitude and longitude GPS coordinates and an elevation with respect to sea level, which may be referred to as altitude. Although the elevation element of the location is mentioned as referenced to sea level, other elevation references are possible, and the scope of claimed subject matter is not limited in this respect. In this example, the elevation is represented as meters above sea level, but again, the scope of claimed subject matter is not so limited. Also depicted in FIG. 7 is mobile station 200. If mobile station 200 is located outside of building 710, for example, it may be able to receive SPS signals from an SPS system, such as system 110, depicted in FIG. 1, and mobile station 200 may calculate its estimated position based at least in part on the SPS signals in combination with information provided by location server 170, for example. However, if a user carries mobile station 200 into building 710, SPS signals may not be available. In such a situation, mobile station 200 may perform dead reckoning navigation operations in an effort to track movements of the mobile station and to continually, or at least periodically update the mobile station's estimated location based on the measured movements. In an aspect, the estimated position of mobile station 200 may include an elevation component, and the dead reckoning navigation operations may attempt to track changes in elevation. Dead reckoning navigation operations may comprise tracking displacements in latitude, longitude, and altitude from a reference position, in an aspect. As is discussed more fully below, latitude, longitude, and altitude displacement tracking operations may be used to help estimate a location for an access point located in a building where no SPS signals are available.

In an aspect, assume that a user carries mobile station 200 into building 710, and that the user rides an elevator from the ground floor to the second floor. Mobile station 200 may perform dead reckoning calculations to estimate a change in elevation experienced as mobile station 200 moved from the ground floor to the second floor. Such measurements may incur cumulative errors. However, if the distance between two floors of building 710 is known, one may adjust the estimated change in elevation calculated by mobile station 200 to compensate for the accumulated errors. For the present example, the vertical distance between floors of building 710 is labeled in FIG. 7 by Floor Separation 712. Of course, in other examples the distance between two floors of a building may not be known, and the dead reckoning navigation operations may be performed without the benefit of knowing the distance between two floors.

In one or more aspects, mobile station 200 may determine an estimated initial position. Such a position may be the last position determined with the aid of SPS signals before mobile station 200 enters building 710. Upon losing reception of the SPS signals, mobile station 200 may commence dead reckoning calculations and may make relatively frequent adjustments to the estimated location based at least in part on the dead reckoning operations, in one example implementation. Also, as previously mentioned and as explained in more detail below, displacement tracking for latitude, longitude, and altitude may be initiated at a reference position, which for some example implementations may not be the last known position determined with the help of SPS signals. For example, in one or more examples that will be described below, displacement tracking operations may utilize a location within building 710 from which mobile station 200 observes an access point as a reference. In such a situation, latitude, longitude, and altitude displacement information may be reset to zero, and mobile station 200 may commence displacement tracking operations from that spot. Mobile station may utilize the tracked displacement information to calculate an estimated position for the access point at least in part in response to mobile station 200 gaining access to SPS signals so that a relatively accurate position fix may be performed for mobile station 200.

In order to perform displacement tracking operations or dead reckoning navigation operations, mobile station 200 may comprise one or more sensors. In one or more example implementations, the one or more sensors may be incorporated into an inertial measurement unit such as IMU 270, although the scope of claimed subject matter is not limited in this respect.

The one or more sensor incorporated into mobile station 200, whether packaged in an IMU or whether implemented as separate components, may comprise any of a range of sensor types. A variety of sensors may be available to support a number of applications. These sensors may convert physical phenomena into analog and/or electrical signals. Such sensors may include, for example, an accelerometer. An accelerometer may sense the direction of gravity and any other force experienced by the sensor. The accelerometer may be used to sense linear and/or angular movement, and may also be used, for example, to measure tilt and/or roll. Yet another sensor type may include a gyroscope which measures the Coriolis effect and may be used in applications measuring heading changes or in measuring rate of rotation.

Another sensor type may include a barometric pressure sensor. A barometric pressure sensor may be used to measure atmospheric pressure. Applications for the barometric pressure sensor may include determining altitude. Other applications may include observing atmospheric pressure as it relates to weather conditions.

Another type of sensor may include a magnetic field sensor that may measure the strength of a magnetic field and, correspondingly, the direction of a magnetic field. A compass is an example of a magnetic field sensor. The compass may find use in determining absolute heading in car and pedestrian navigation applications.

Figure 8:
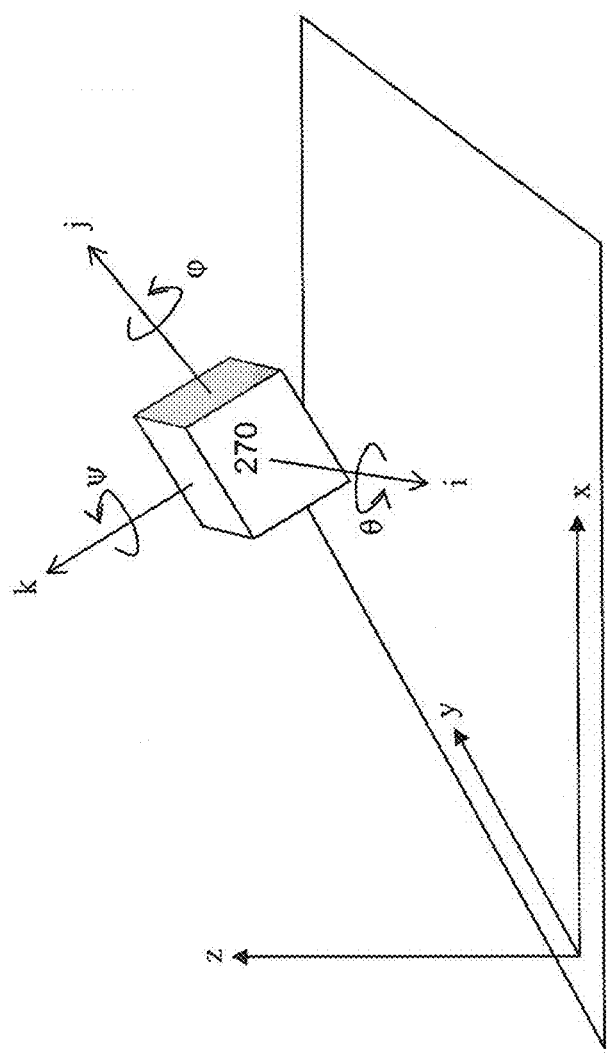
FIG. 8 is a diagram illustrating an example inertial measurement unit with a plurality of degrees of freedom.

FIG. 8 is a diagram illustrating example IMU 270 with a plurality of degrees of freedom. As noted above, in navigation applications, accelerometers, gyroscopes, geomagnetic sensors, and pressure sensors may be utilized to provide various degrees of observability. In an aspect, IMU 270 may comprise at least one accelerometer and at least one gyroscope, although the scope of claimed subject matter is not limited in this respect. For one example, and as depicted in FIG. 8, the accelerometer and gyroscope may provide six axes of observability (i, j, k, $\theta$, $\phi$, $\psi$). As mentioned above, the accelerometer may sense linear motion (translation in any plane, such as a local horizontal plane). This translation may be measured with reference to at least one axis. The accelerometer may also provide a measure of an object's tilt (roll or pitch). Thus, with the accelerometer, an object's motion in Cartesian coordinate space (i, j, k) may be sensed, and the direction of gravity may be sensed to estimate an object's roll and pitch. The gyroscope may be used to measure the rate of rotation about (i, j, k), i.e., roll ($\theta$) and pitch ($\phi$) and yaw, which may also be referred to as azimuth or "heading" ($\psi$). Of course, IMU 270 merely represents on example, and the various degrees of observability are also merely examples. The scope of claimed subject matter is not limited to these specific examples. Also, IMU 270 may comprise a relatively accurate measurement unit with a relatively high cost, or may comprise a less accurate measurement unit that may provide cost savings and perhaps smaller, simpler designs. The scope of claimed subject matter is not limited to any particular sensors and/or IMU, and a range of levels of accuracy for the sensors and/or IMU may be specified for a range of possible implementations in accordance with claimed subject matter.

In one example implementation of a technique for determining position information for an access point within a building where no SPS signals are available to help with position fix operations, a mobile station equipped with one or more sensors may be utilized. Such sensors may comprise, for example, an accelerometer and/or a gyroscope, to name merely two examples. The mobile station may track latitude, longitude, and altitude displacement information to and/or from a reference point such as a spot with the building where the mobile station observes the access point. The mobile station may utilize the displacement information to estimate a position for the access point based at least in part on a position fix performed with the aid of SPS signals or performed in some other manner that may provide the mobile station with a relatively accurate position fix. Base station almanac information may be updated with the estimated position of the access point so that in the future, the identity and position of the access point may be utilized by other mobile stations to perform position fix operations. Without relatively accurate position information for the access point, position fix operations for a mobile station may not be successfully completed. In another aspect, in order to increase the accuracy of the position estimate for the access point, an individual mobile station may calculate a number of estimated positions for the access point as the mobile station revisits the area of the access point. Further, a number of mobile stations may perform one or more position estimates for the access point in the manner described herein, and the various estimates may be used to calculate a more accurate estimate. In another aspect, individual mobile stations may utilize the more accurate position estimate to determine a bias in the mobile station's sensors so that future tracking operations may provide more accurate displacement values.

As discussed previously, position fix information may be gathered by a number of mobile stations, and such information may be provided to a network. The network may utilize the gathered information to update base station almanac information, and at least a portion of such updated information may be provided to one or more mobile stations to enable the mobile stations to perform more efficient and accurate position fixes. In an aspect, the gathered position fix information may include access point estimated location information determined through the use of sensors and displacement tracking as described herein. In this manner, the large numbers of access points that are located within buildings where SPS signals and/or other signals may not be available for position fix operations may be identified and their estimated locations included in base station almanac information provided to mobile stations from the network. Sensor systems, including discrete sensors and/or IMUs, used in displacement tracking operations in an aspect need not be highly accurate in at least some example implementations since information from a number of mobile stations may be collectively utilized to estimate a position of an access point and to update the base station almanac database. Also, a number of estimates may be performed by an individual mobile station, and the various estimates may be used to determine a more accurate estimate and also to determine a bias for the sensors so that future tracking operations may yield more accurate displacement values. Less accurate sensor systems may have the potential advantages of lower cost and smaller, simpler designs. Base station almanac databases that may be updated and/or maintained through the example techniques described herein may include, but are not limited to, cellular network databases and Wi-Fi/WLAN network databases. Of course, the scope of claimed subject matter is not limited in this respect, and the example processes described herein may be utilized to update and/or maintain databases related to any type of transmitter for any type of wireless network.

Figure 9:
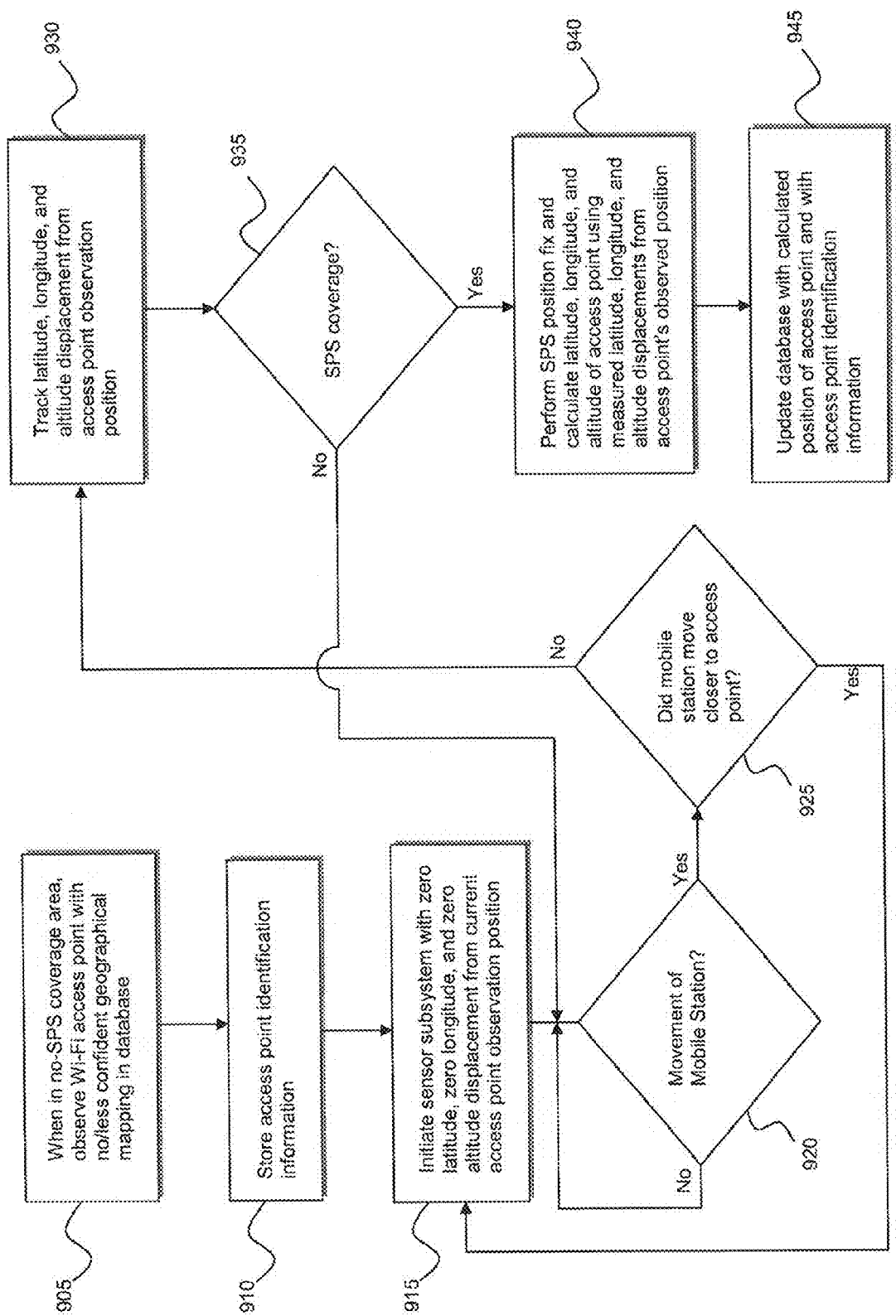
FIG. 9 is a flow diagram depicting an example process for determining a position of an access point utilizing sensor measurement information.
Figure 10:
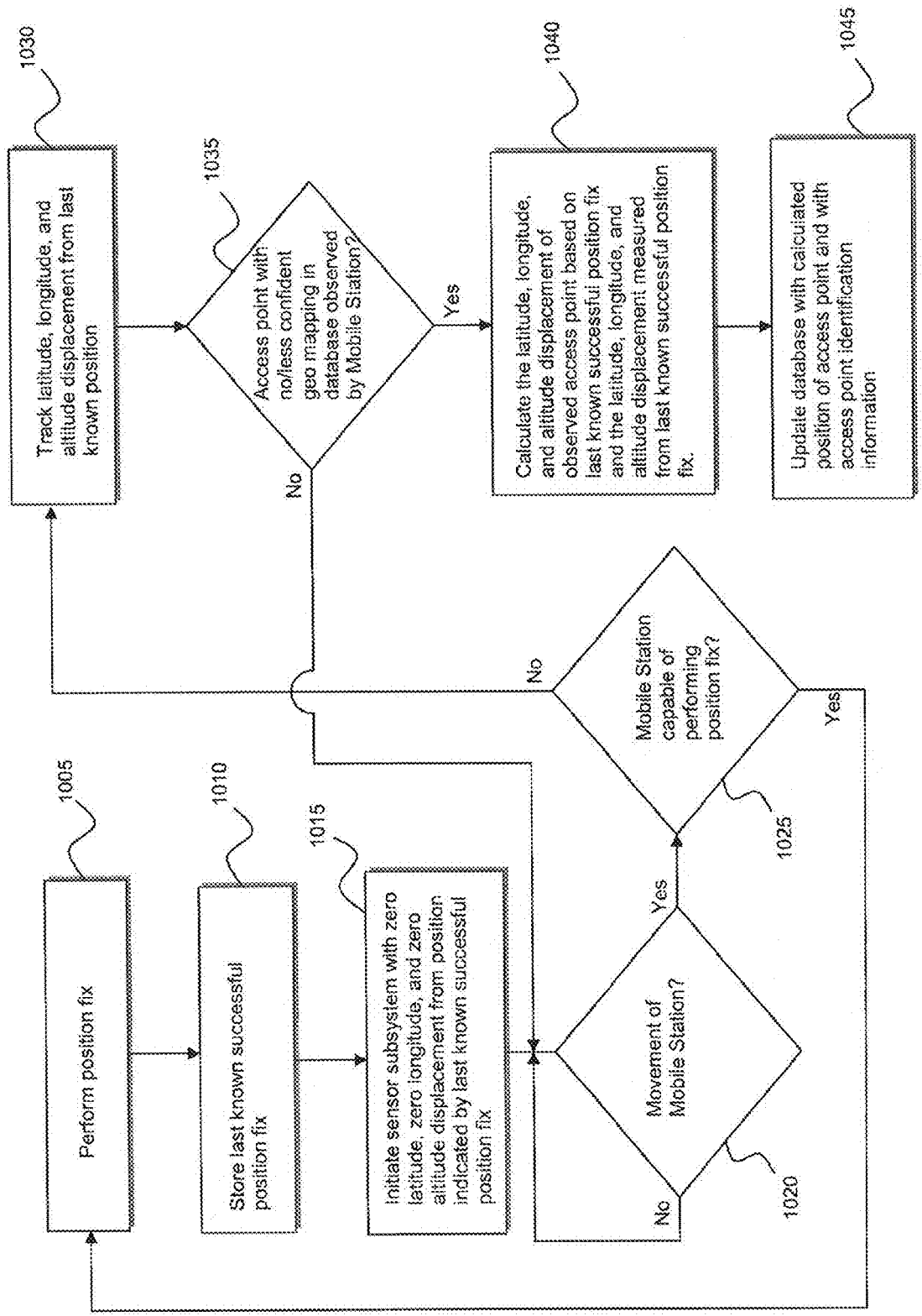
FIG. 10 is a flow diagram depicting an additional example process for determining a position of an access point utilizing sensor measurement information.

In an aspect, if a mobile phone attempts to perform a position fix using a Wi-Fi/WLAN network and observes an access point that is not included in a Wi-Fi/WLAN network database, the mobile station may attempt to update the Wi-Fi/WLAN network database with that access point's identification and mobile station's current location. However, if the mobile station tries to use the Wi-Fi/WLAN network for a position fix in a location where there is no SPS coverage and if the Wi-Fi/WLAN network database does not include a record for the observed access point, the position fix using the Wi-Fi/WLAN network will fail to give the mobile station its current location, and the position fix operation initiated by the mobile station will fail. However, if the Wi-Fi/WLAN network database is updated with a record mapping this access point and its estimated position, future attempts to use the Wi-Fi/WLAN network to perform position fixes for mobile stations at this location will result in successful position fixes. FIGS. 9 and 10 depict example processes for updating a Wi-Fi/WLAN network database and/or another base station almanac database with missing or outdated access point identification and position information in situations where the mobile station may be in an area without SPS coverage and/or without other means to perform relatively accurate position fixes.

FIG. 9 depicts an example process for estimating a position of an access point in a building where SPS signals may not be available to a mobile station. At block 905, a mobile station may observe a WLAN/Wi-Fi access point. That is, the mobile station may receive a beacon signal from the access point. The mobile station may identify the access point via the beacon signal, and may determine whether base station almanac information is available for the access point. If no geographic information related to the access point is included in the base station almanac database, or if the database includes information related to the access point with a lesser degree of confidence that the information is sufficiently accurate, the mobile station may store the access point identification information as depicted at block 910, and the process may proceed to block 915. At block 915, the mobile station may initiate a sensor subsystem with displacement values of zero for latitude, longitude, and altitude. Thus, the mobile station may track its movements from the location at which the access point was observed by the mobile station and the current position of the mobile station may serve as the reference point for the displacement tracking operations. The tracking of the movements of the mobile station may be accomplished using one or more sensors incorporated into the mobile station. Information with respect to the accumulated displacements in latitude, longitude, and altitude may be stored in a memory in the mobile station and may be continually updated as the mobile station moves within the building. For example, at block 920 a determination may be made based on sensor data as to whether the mobile station has moved from mobile stations last position, which initially is the location at which the mobile station observed the access point. As depicted at block 920, if movement of the mobile station is detected, the process proceeds to block 925. At block 925, a determination may be made as to whether the mobile station moved closer to the access point. The determination of whether the mobile station has moved closer to the access point may be made, in one aspect, by observing the signal strengths for signals received from the access point. For example, if a beacon signal from the access point received by the mobile station at its current position is determined to have a greater signal strength than a beacon signal received by the mobile station at the current access point observation position at an earlier point in time, the access point may be assumed to have moved closer to the access point. If it is indeed determined that the mobile station has moved closer to the access point, the process returns to block 915 where the displacement values are reset to zero, and the current location of the mobile station acts as the new access point observation position. The closer the mobile station is to the access point at the beginning of the tracking operations, the more accurate the end result will be for the estimated position of the access point.

Continuing with the example process depicted in FIG. 9, if at block 925 it is determined that the mobile station has not moved closer to the access point, the latitude, longitude, and altitude displacement is tracked from the access point observation position, also referred to as the reference position. At block 935, a determination may be made as to whether the mobile station has entered an area with SPS coverage. For example, the mobile station may be carried outside of the building or to an area of the building where SPS signals may be received. If there is no SPS coverage at the current position of the mobile station, the process returns to block 920 where the determination is made again as to whether the mobile station has moved from its last position. If so, the determination is made again at block 925 as to whether the mobile station has moved closer to the access point.

For the period of time in which the mobile station does not move closer to the access point and in which there is no SPS coverage, the process cycles through blocks 920, 925, 930, and 935. Of course, for the present example process, if the mobile station is determined to have moved closer to the access point than the current access point observation position, the process returns to block 915 wherein the latitude, longitude, and altitude displacement tracking operations begin anew, with the displacement values being nulled or cleared to values of zero. At some point in time, the mobile station may have access to an SPS system, for example if the mobile station exits the building, and the mobile station may perform a position fix utilizing SPS signals, as depicted at blocks 935 and 940. At block 940, the SPS position fix may be performed for the mobile station, and the tracked displacement values for latitude, longitude, and altitude from the access point observation position may be utilized to calculate an estimated position for the access point. In an aspect, the latitude, longitude, and altitude displacement values may be subtracted from the latitude, longitude, and altitude values from the SPS position fix for the mobile station. The calculated position for the access point may be used to update a base station almanac database. In another aspect, the base station almanac may further be updated with the access point identification information previously stored in memory in the mobile station. The scope of claimed subject matter may include all of, less than, or more than boxes 905-945 depicted in FIG. 9. Also, the order of boxes of 905-945 is merely an example order, and the scope of claimed subject matter is not limited in this respect.

FIG. 10 depicts an additional example process for estimating a position of an access point in a building where SPS signals may not be available to a mobile station. For this example process, a reference point may be established by performing a position fix, perhaps using SPS signals or other technique for providing a relatively accurate position fix. In response to the position fix and the establishment of the reference position, the mobile station may track the latitude, longitude, and altitude displacements from the reference point until the mobile station observes an access point. In response to the observation of the access point, the tracked latitude, longitude, and altitude displacement values may be utilized to calculate an estimated position for the access point.

With respect to the example process depicted in FIG. 10, a position fix may be performed by a mobile station at block 1005. In an aspect, the position fix may comprise a relatively accurate position fix. In another aspect, the position fix may be based, at least in part, on one or more signals received from an SPS system. At block 1010, the result of the position fix operation from block 1005 may be stored in a memory in the mobile station. The position fix may be referred to as the last known successful position fix for this example process. At block 1015, the mobile station may initiate a sensor subsystem within the mobile station with displacement values of zero for latitude, longitude, and altitude. Thus, the mobile station may track its movements from the location indicated by the last known successful position fix. The last known successful position fix location may serve as the reference point for the displacement tracking operations. The tracking of the movements of the mobile station may be accomplished using one or more sensors incorporated into the mobile station. Information with respect to the accumulated displacements in latitude, longitude, and altitude may be stored in a memory in the mobile station and may be continually updated as the mobile station moves within the building. For example, at block 1020 a determination may be made based on sensor data as to whether the mobile station has moved from mobile station's last position, which initially is the location indicated by the last known successful position fix. If movement of the mobile station is detected, the process moves to block 1025.

At block 1025, a determination may be made as to whether the mobile station has gained the ability to perform a position fix. For example, the mobile station may have moved to a location where SPS signals may be received. If it is determined that the mobile station has the ability to perform a position fix, the process moves back to block 1005. As indicated at block 1005, a new position fix is obtained for the mobile station, and the new position fix is stored as the last known successful position fix at block 1010. As depicted at block 1015, the last known successful position fix location is used as the reference position for the displacement operations that begin anew, with the latitude, longitude and altitude displacement values being nulled or cleared to a value of zero. If at block 1025 it is determined that the mobile station is not capable of performing a position fix, the process moves to block 1030 where the latitude, longitude, and altitude displacement tracking operations are depicted.

In an aspect of the present example process, the operations of blocks 1020, 1025, 1030, and 1035 may be repeated in a cycle that may be broken either by the mobile station gaining the ability to perform a position fix at block 1025 or the mobile station observing an access point with either no geographical mapping information in the base station almanac database or with geographical mapping information with a lesser degree of confidence of sufficient accuracy in the base station almanac database, as depicted at block 1035. If an access point is observed by the mobile station, the tracked latitude, longitude, and altitude displacements may be utilized to calculate an estimated position of the access point. For example, the displacement values may be added to the position coordinates for the last known successful position fix to obtain the estimated position of the access point. Of course, the closer the mobile station is to the access point when the tracking operations are ceased, the more accurate the estimated position for the access point will be.

At least in part in response to calculating the estimated position for the observed access point, a database may be updated at block 1045 with the calculated position of the access point. The database may further be updated with identification information for the access point. The scope of claimed subject matter may include all of, less than, or more than boxes 1005-1045 depicted in FIG. 10. Also, the order of boxes of 1005-1045 is merely an example order, and the scope of claimed subject matter is not limited in this respect.

In another aspect, in order to obtain a relatively accurate position estimate for the access point, the access point may be observed by the mobile station at multiple locations. The mobile station may determine which of the observation locations is likely to be closest to the access point, and may obtain estimated positions for the individual observation locations. At least in part in response to the mobile station determining which information from which observation point is likely to provide the most accurate result, the mobile station may transmit the position fix information to a network entity and the database may be updated. By waiting until the mobile station has found an observation point that seems to be closest to the transmitter, multiple write operations to the database may be avoided.

In another aspect, rather than updating the appropriate database in response to an estimation of a position of an access point from a single mobile station, a network entity, perhaps a database server such as BSA database server 180 depicted in FIG. 1, may gather several samples for that particular access point, and after receiving a selectable number of position estimations for the access point, the database server may determine position information with which to update the database. In one aspect, the server may average the position estimates, or may use a weighted average of the various position estimates, with more recent position estimates receiving more weight than estimates received earlier. In another aspect, the server may simply select a position estimate for the access point that appears to be the more accurate, based on any of a range of criteria.

In another aspect, mobile stations implemented with SPS position fix capabilities and sensor-based displacement tracking capabilities may provide advantages related to database efficiency. For example, accurate position fixes performed using SPS signals may be combined with latitude, longitude, and altitude displacement tracking information provided at least in part by sensors of a mobile station to provide position fixes for the mobile station in areas where no SPS signals are available. For this example, no Wi-Fi access point signals are utilized to perform the position fix. Therefore, in an example implementation, it may not be necessary to gather and store information related to Wi-Fi access points in a base station almanac, because such information would not be required by mobile stations supporting SPS/sensor position fix operations in order to perform such operations. By eliminating or reducing the amount of information related to Wi-Fi access points gathered for a base station almanac, for example, the effort involved in creating the almanac is reduced, along with the size of the almanac. Of course, these are merely examples of how sensor data may be used advantageously in conjunction with position fix operations, and the scope of claimed subject matter is not limited in these respects.

Figure 11:
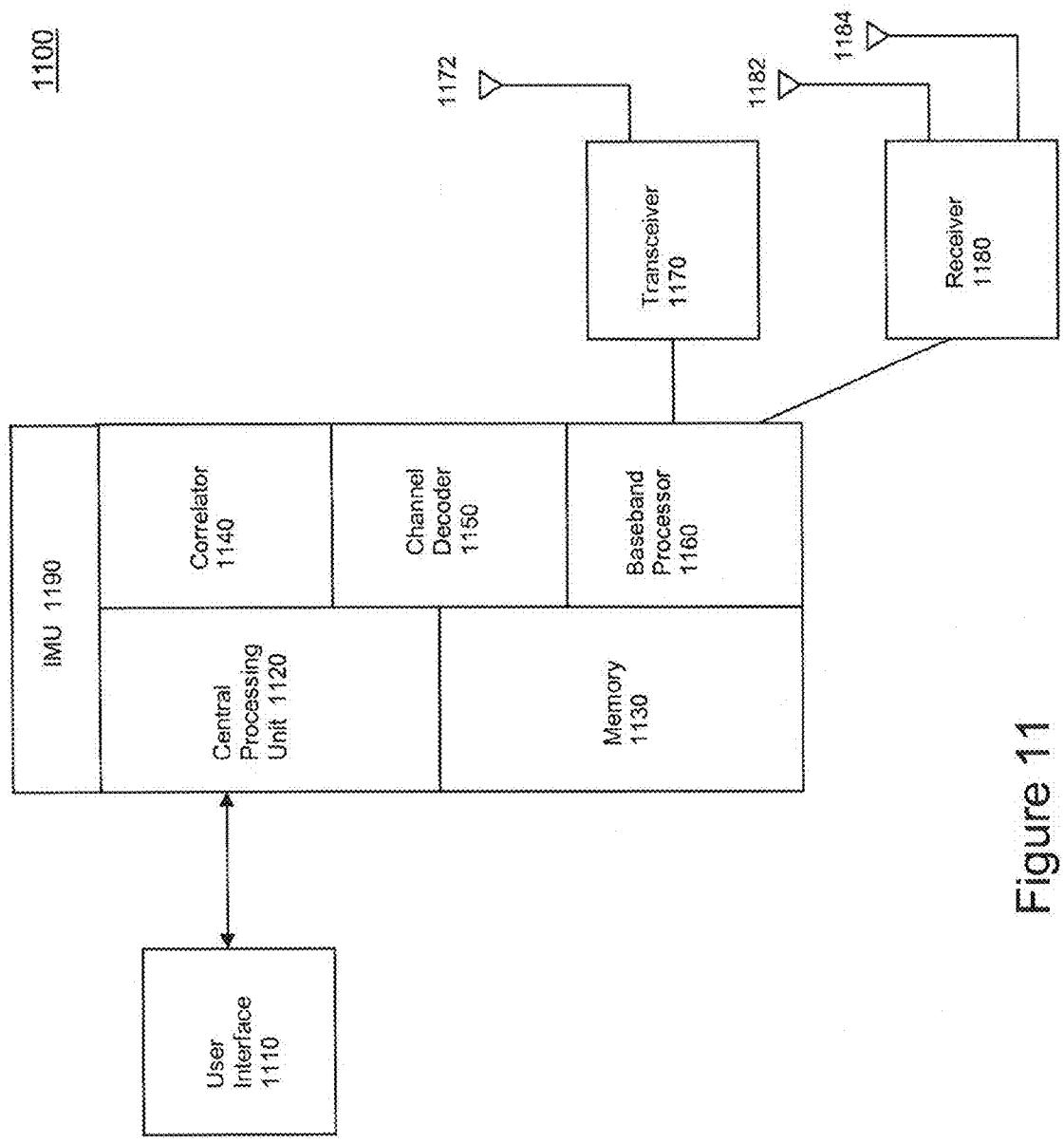
FIG. 11 is a schematic block diagram depicting an example mobile station.

FIG. 11 is a block diagram illustrating another example of mobile station 1100 that may be adapted to perform any of the example techniques described herein in connection with FIGS. 1-10. One or more radio transceivers 1170 may be adapted to modulate an RF carrier signal with baseband information, such as voice or data, onto an RF carrier, and demodulate a modulated RF carrier to obtain such baseband information. An antenna 1172 may be adapted to transmit a modulated RF carrier over a wireless communications link and receive a modulated RF carrier over a wireless communications link.

A baseband processor 1160 may be adapted to provide baseband information from a central processing unit (CPU) 1120 to transceiver 1170 for transmission over a wireless communications link. Here, CPU 1120 may obtain such baseband information from an input device within a user interface 1110. Baseband processor 1160 may also be adapted to provide baseband information from transceiver 1170 to CPU 1120 for transmission through an output device within user interface 1110.

In another aspect, for this example implementation, mobile station 1100 may comprise an inertial measurement unit (IMU) 1190. IMU 1190 may comprise one or more sensors. Example types of sensors that may be incorporated into IMU 1190 include, but are not limited to, an accelerator and a gyroscope, although claimed subject matter is not limited in this respect.

User interface 1110 may comprise a plurality of devices for inputting or outputting user information such as voice or data. Such devices may include, by way of non-limiting examples, a keyboard, a display screen, a microphone, and a speaker.

A receiver 1180 may be adapted to receive and demodulate transmissions from an SPS, and provide demodulated information to correlator 1140. Correlator 1140 may be adapted to derive correlation functions from the information provided by receiver 1180. Correlator 1140 may also be adapted to derive pilot-related correlation functions from information relating to pilot signals provided by transceiver 1170. This information may be used by a mobile station to acquire wireless communications services. Channel decoder 1150 may be adapted to decode channel symbols received from baseband processor 1160 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 1150 may comprise a turbo decoder.

A memory 1130 may be adapted to store machine-readable instructions which are executable to perform one or more of processes, implementations, or examples thereof which are described or suggested herein. CPU 1120 may be adapted to access and execute such machine-readable instructions. Memory 1130 for this example may also be adapted to store one or more of a fix database, a cell database, or base station almanac information.

Figure 12:
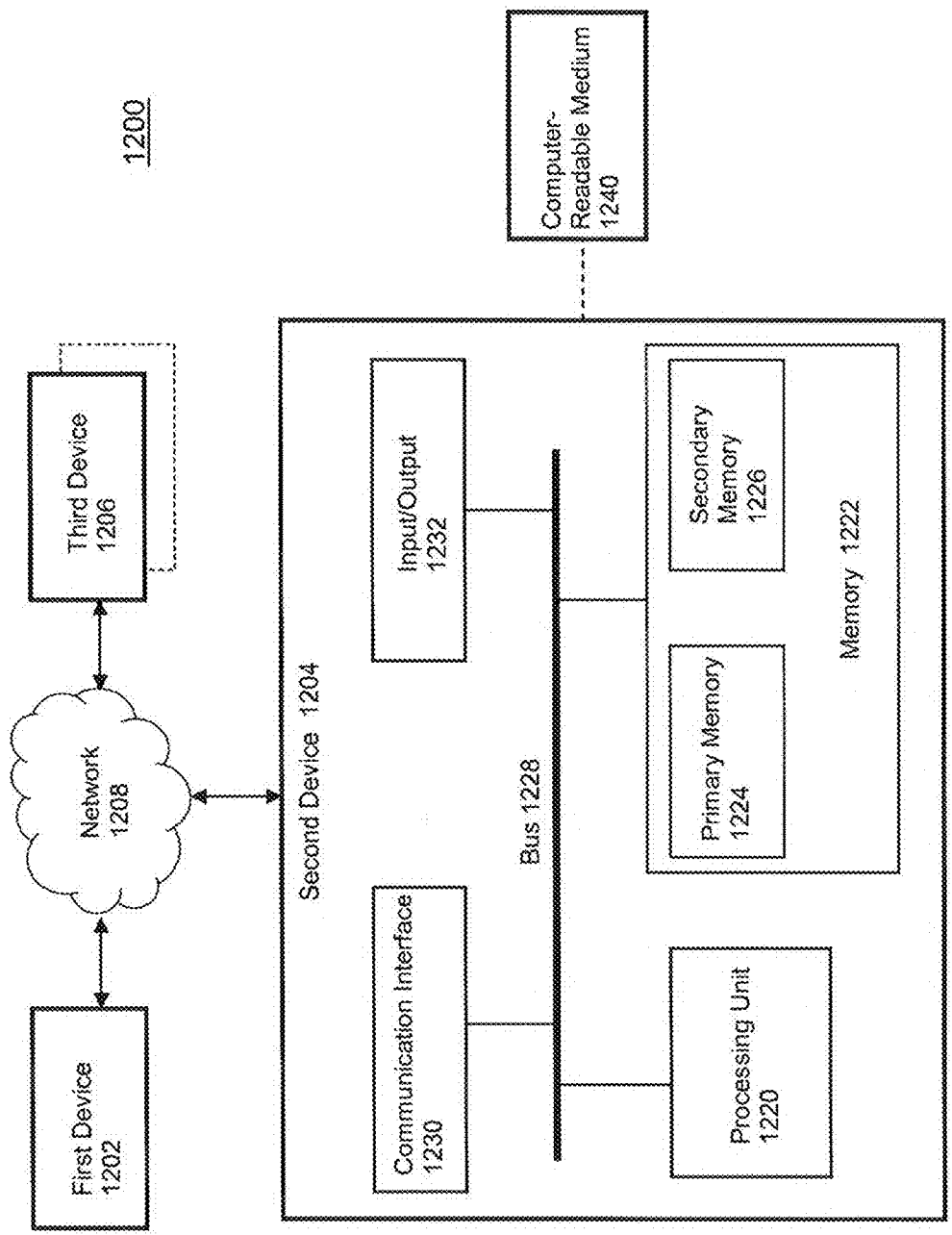
FIG. 12 is a schematic block diagram of an example computing platform.

FIG. 12 is a schematic diagram illustrating an example computing and communications environment 1200 that may include one or more devices configurable to implement techniques and/or processes described above, for example, in connection with example techniques for requesting and transmitting BSA information and/or fix and cell database information depicted in FIGS. 1-10. System 1200 may include, for example, a first device 1202, a second device 1204, and a third device 1206, which may be operatively coupled together through a network 1208.

First device 1202, second device 1204 and third device 1206, as shown in FIG. 12, may be representative of any device, appliance or machine that may be configurable to exchange data over wireless communications network 1208. By way of example but not limitation, any of first device 1202, second device 1204, or third device 1206 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Any of the first, second, and third devices 1202, 1204, and 1206, respectively, may comprise one or more of a base station almanac database server, a base station, and/or a mobile station in accordance with the examples described herein.

Similarly, network 1208, as shown in FIG. 12, is representative of one or more communication links, processes, and/or resources configurable to support the exchange of data between at least two of first device 1202, second device 1204, and third device 1206. By way of example but not limitation, network 1208 may include wireless and/or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to network 1208.

It is recognized that all or part of the various devices and networks shown in system 1200, and the processes and methods as further described herein, may be implemented using or otherwise including hardware, firmware, software, or any combination thereof.

Thus, by way of example but not limitation second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 and/or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

Secondary memory 1226 may include, for example, the same or similar type of memory as primary memory and/or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any medium that can carry and/or make accessible data, code and/or instructions for one or more of the devices in system 1200. Computer readable medium 1240 may also be referred to as a storage medium.

Second device 1204 may include, for example, a communication interface 1230 that provides for or otherwise supports the operative coupling of second device 1204 to at least network 1208. By way of example but not limitation, communication interface 1230 may include a network interface device or card, a modem, a router, a switch, a transceiver, and the like.

Second device 1204 may include, for example, an input/output 1232. Input/output 1232 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

Techniques described herein may be used with any one or more of several SPS, including the aforementioned SPS, for example. Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
    determining additional fix information associated with an estimation of a position of a mobile station, wherein said additional fix information comprises one or more measurements obtained from processing one or more wireless signals received at a receiver of the mobile station from one or more base stations;
    storing the additional fix information in a memory of the mobile station in a current fix database entry in a fix database based, in part on,
        determining a priority value for the current fix database entry,
        comparing the priority value for the current fix database entry with priority values for a plurality of previously stored fix database entries, and
        storing the current fix database entry according to a priority scheme for the additional fix information; and
    transmitting one or more signals representative of at least a subset of the additional fix information into a network.

2. The method of claim 1, further comprising
    receiving one or more signals representative of updated almanac information from the network, wherein said updated almanac information is based, at least in part, on said subset of additional fix information.

3. The method of claim 2, further comprising performing one or more mobile station operations utilizing at least a portion of the updated almanac information, wherein said one or more mobile station operations comprises one or more of:
    determining one or more base stations and/or satellite signals for which the mobile station is to search;
    determining one or more time and/or frequency search windows for satellite and/or terrestrial wireless signals;
    maintaining a background position fix solution in the mobile station at least in part by performing periodic network-based position fixes;
    maintaining a mobile station clock at least in part by performing periodic network-based position and/or time fixes;
    performing a hybrid position fix with one or more varied terrestrial-based measurement types and/or one or more varied satellite-based measurement types;
    performing a fall-back position fix solution if a preferred measurement type search fails to provide a navigation solution; and
    performing a network-based position fix that is sufficiently accurate and/or timely to avoid a need for further satellite and/or terrestrial signals.

4. The method of claim 1, wherein said estimation of the position of the mobile station is based, at least in part, on prior base station almanac information received from the network and stored in the memory of the mobile station.

5. The method of claim 1, wherein said one or more measurements obtained from processing the one or more wireless signals comprise propagation delay information from one or more cells of a cellular network and wherein said determining the additional fix information comprises receiving transmitter location information broadcasted by a transmitter and further wherein storing the additional fix information comprises storing the transmitter location information in the memory as additional fix information.

6. The method of claim 1, further comprising receiving one or more satellite positioning system (SPS) signals from one or more space vehicles at the mobile station, wherein said estimation of the position of the mobile station is based, at least in part, on one or more measurements obtained from processing said one or more SPS signals.

7. The method of claim 1, wherein said storing the additional fix information in the memory of the mobile station according to the priority scheme further comprises storing the additional fix information in a cell database in the memory of the mobile station according to the priority scheme.

8. The method of claim 1, wherein said storing the additional fix information in the current fix database entry according to the priority scheme comprises storing the additional fix information according to a first-in, first-out priority scheme, wherein more recent fix database entries are accorded a higher priority value over less recent fix database entries.

9. The method of claim 1, wherein said determining the priority value is based, at least in part, on one or more of:
an accuracy of the prior base station almanac information;
distances in space between the current fix database entry and neighboring entries comprising a prior fix database entry and a following fix database entry;
differences in time between the current fix database entry and the neighboring entries;
a level of confidence that the prior base station almanac information is provided by a trusted source;
a level of statistical significance for one or more entries of the prior base station almanac information;
a level of desire for additional almanac information based at least in part on whether the prior base station almanac information comprises information related to a known coverage area; and
a determination of whether the prior base station almanac information comprises unknown or unreliable information, and whether additional almanac information is relatively highly desired.

10. A method, comprising:
determining additional fix information associated with an estimation of a position of a mobile station, wherein said additional fix information comprises one or more measurements obtained from processing one or more wireless signals received at a receiver of the mobile station from one or more base stations;
storing the additional fix information in a memory of the mobile station according to a priority scheme for the additional fix information;
transmitting one or more signals representative of at least a subset of the additional fix information into a network; and
estimating a position of an access point in an area where insufficient wireless signals are available to perform a position fix for the mobile station, wherein the mobile station comprises one or more sensors, the mobile station to estimate the position of the access point at least in part by calculating a position from which the mobile station observes the access point, wherein said calculating is based at least in part on one or more displacement values generated at least in part by the one or more sensors and further based at least in part on a pre-observation and/or a post-observation position fix for the mobile station, the pre-observation position fix to occur at a point in time prior to the mobile station observing the access point and the post-observation position fix to occur at a point in time subsequent to the mobile station observing the access point.

11. The method of claim 10, wherein said one or more displacement values are generated by the one or more sensors tracking longitude, latitude, and altitude displacement values from the position from which the mobile station observes the access point to the post-observation position fix location.

12. The method of claim 10, wherein said one or more displacement values are generated by the one or more sensors tracking longitude, latitude, and altitude displacement values from the pre-observation position fix location to the position from which the mobile station observes the access point.

13. A mobile station, comprising:
a receiver to receive one or more wireless signals at a mobile station from one or more terrestrial wireless transmitters;
a processor coupled to the receiver, the processor to determine additional fix information associated with an estimation of a position of a mobile station, wherein said additional fix information comprises one or more measurements obtained from processing said one or more wireless signals received at the receiver, the processor to store the additional fix information in a memory of the mobile station in a current fix database entry in a fix database by,
determining a priority value for the current fix database entry,
comparing the priority value for the current fix database entry with priority values for a plurality of previously stored fix database entries, and
storing the current fix database entry according to a priority scheme for the additional fix information; and
a transmitter coupled to the processor, the transmitter to transmit one or more signals representative of at least a subset of the additional fix information into a network.

14. The mobile station of claim 13, the receiver to receive one or more signals representative of updated almanac information from the network, wherein said updated almanac information is based, at least in part, on said subset of additional fix information.

15. The mobile station of claim 14, the processor further to perform one or more mobile station operations utilizing at least a portion of the updated almanac information, the processor to perform said one or more mobile station operations at least in part by performing one or more of:
determining one or more base stations and/or satellite signals for which the mobile station is to search;
determining one or more time and/or frequency search windows for satellite and/or terrestrial wireless signals;
maintaining a background position fix solution in the mobile station at least in part by performing periodic network-based position fixes;
maintaining a mobile station clock at least in part by performing periodic network-based position and/or time fixes;
performing a hybrid position fix with one or more varied terrestrial-based measurement types and/or one or more varied satellite-based measurement types;
performing a fall-back position fix solution if a preferred measurement type search fails to provide a navigation solution; and performing a network-based position fix that is sufficiently accurate and/or timely to avoid a need for further satellite and/or terrestrial signals.

16. The mobile station of claim 13, wherein the estimation of the position of the mobile station is based, at least in part, on prior base station almanac information received at the receiver from the network and stored in the memory of the mobile station.

17. The mobile station of claim 13, wherein said one or more measurements obtained from processing the one or more wireless signals comprise propagation delay information from one or more cells of a cellular network, the processor further to determine the additional fix information at least in part by receiving transmitter location information broadcasted by a transmitter and to store said additional fix information at least in part by storing said transmitter location information in the memory as additional fix information.

18. The mobile station of claim 13, the receiver further to receive one or more satellite positioning system (SPS) signals from one or more space vehicles, and wherein the estimation of the position of the mobile station is based, at least in part, on one or more measurements obtained from processing said one or more SPS signals.

19. The mobile station of claim 13, the processor further to store the additional fix information in a cell database in the memory of the mobile station according to the priority scheme.

20. The mobile station of claim 13, the processor to store the additional fix information in the current fix database entry according to the priority scheme at least in part by storing the additional fix information according to a first-in, first-out priority scheme, wherein more recent fix database entries are accorded a higher priority value over less recent fix database entries.

21. The mobile station of claim 13, the processor to determine the priority value based, at least in part, on one or more of:
an accuracy of the prior base station almanac information;
distances in space between the current fix database entry and neighboring entries comprising a prior fix database entry and a following fix database entry;
differences in time between the current fix database entry and the neighboring entries;
a level of confidence that the prior base station almanac information is provided by a trusted source;
a level of statistical significance for one or more entries of the prior base station almanac information;
a level of desire for additional almanac information based at least in part on whether the prior base station almanac information comprises information related to a known coverage area; and
a determination of whether the prior base station almanac information comprises unknown or unreliable information, and whether additional almanac information is relatively highly desired.

22. A mobile station, comprising:
a receiver to receive one or more wireless signals at a mobile station from one or more terrestrial wireless transmitters;
a processor coupled to the receiver, the processor to determine additional fix information associated with an estimation of a position of a mobile station, wherein said additional fix information comprises one or more measurements obtained from processing said one or more wireless signals received at the receiver, the processor to store the additional fix information in a memory of the mobile station according to a priority scheme for the additional fix information; and
a transmitter coupled to the processor, the transmitter to transmit one or more signals representative of at least a subset of the additional fix information into a network;
the processor further to estimate a position of an access point in an area where insufficient wireless signals are available to perform a position fix for the mobile station, wherein the mobile station comprises one or more sensors, the processor to estimate the position of the access point at least in part by calculating a position from which the mobile station observes the access point, wherein said calculating is based at least in part on one or more displacement values generated at least in part by the one or more sensors and further based at least in part on a pre-observation and/or a post-observation position fix for the mobile station, the pre-observation position fix to occur at a point in time prior to the mobile station observing the access point and the post-observation position fix to occur at a point in time subsequent to the mobile station observing the access point.

23. The mobile station of claim 22, said one or more displacement values to be generated by the one or more sensors tracking longitude, latitude, and altitude displacement values from the position from which the mobile station observes the access point to the post-observation position fix location.

24. The mobile station of claim 22, said one or more displacement values to be generated by the one or more sensors tracking longitude, latitude, and altitude displacement values from the pre-observation position fix location to the position from which the mobile station observes the access point.

25. An apparatus, comprising:
means for determining additional fix information associated with an estimation of a position of a mobile station, wherein said additional fix information comprises one or more measurements obtained from processing one or more wireless signals received at a receiver of the mobile station from one or more base stations;
means for storing the additional fix information in a memory of the mobile station in a current fix database entry in a fix database, the means for storing the additional fix information comprising,
means for determining a priority value for the current fix database entry,
means for comparing the priority value for the current fix database entry with priority values for a plurality of previously stored fix database entries, and
means for storing the current fix database entry according to a priority scheme for the additional fix information; and
means for transmitting one or more signals representative of at least a subset of the additional fix information into a network.

26. The apparatus of claim 25, said means for receiving to receive one or more signals representative of updated almanac information from the network, wherein said updated almanac information is based, at least in part, on said subset of additional fix information.

27. The apparatus of claim 26, further comprising means for performing one or more mobile station operations utilizing at least a portion of the updated almanac information, wherein said one or more mobile station operations comprises one or more of:
determining one or more base stations and/or satellite signals for which the mobile station is to search;
determining one or more time and/or frequency search windows for satellite and/or terrestrial wireless signals;

maintaining a background position fix solution in the mobile station at least in part by performing periodic network-based position fixes;

maintaining a mobile station clock at least in part by performing periodic network-based position and/or time fixes;

performing a hybrid position fix with one or more varied terrestrial-based measurement types and/or one or more varied satellite-based measurement types;

performing a fall-back position fix solution if a preferred measurement type search fails to provide a navigation solution; and performing a network-based position fix that is sufficiently accurate and/or timely to avoid a need for further satellite and/or terrestrial signals.

28. The apparatus of claim 25, wherein said estimation of the position of the mobile station is based, at least in part, on prior base station almanac information received from the network and stored in the memory.

29. The apparatus of claim 25, wherein said one or more measurements obtained from processing the one or more wireless signals comprise propagation delay information from one or more cells of a cellular network, wherein said means for determining addition fix information further comprises means for receiving transmitter location information broadcasted by the transmitter, and wherein said means for storing further comprises means for storing said transmitter location information in the memory as additional fix information.

30. The apparatus of claim 25, further comprising means for receiving one or more satellite positioning system (SPS) signals from one or more space vehicles, wherein said estimation of the position of the mobile station is based, at least in part, on one or more measurements obtained from processing said one or more SPS signals.

31. The apparatus of claim 25, further comprising means for storing the additional fix information in a cell database in the memory according to the priority scheme.

32. The apparatus of claim 25, wherein said means for storing the additional fix information in the current fix database entry according to the priority scheme comprises means for storing the additional fix information according to a first-in, first-out priority scheme, wherein more recent fix database entries are accorded a higher priority value over less recent fix database entries.

33. The apparatus of claim 25, wherein said determination of the priority value is based, at least in part, on one or more of:
an accuracy of the prior base station almanac information;
distances in space between the current fix database entry and neighboring entries comprising a prior fix database entry and a following fix database entry;
differences in time between the current fix database entry and the neighboring entries;
a level of confidence that the prior base station almanac information is provided by a trusted source;
a level of statistical significance for one or more entries of the prior base station almanac information;
a level of desire for additional almanac information based at least in part on whether the prior base station almanac information comprises information related to a known coverage area; and
a determination of whether the prior base station almanac information comprises unknown or unreliable information, and whether additional almanac information is relatively highly desired.

34. An apparatus, comprising:
means for determining additional fix information associated with an estimation of a position of a mobile station, wherein said additional fix information comprises one or more measurements obtained from processing one or more wireless signals received at a receiver of the mobile station from one or more base stations;
means for storing the additional fix information in a memory of the mobile station according to a priority scheme for the additional fix information;
means for transmitting one or more signals representative of at least a subset of the additional fix information into a network; and
means for estimating a position of an access point in an area where insufficient wireless signals are available to perform a position fix for the apparatus, wherein the apparatus comprises one or more means for sensing, the means for estimating to estimate the position of the access point at least in part by calculating a position from which the apparatus observes the access point, wherein said calculating is based at least in part on one or more displacement values generated at least in part by the one or more means for sensing and further based at least in part on a pre-observation and/or a post-observation position fix for the apparatus, the pre-observation position fix to occur at a point in time prior to the apparatus observing the access point and the post-observation position fix to occur at a point in time subsequent to the apparatus observing the access point.

35. The method of claim 34, said one or more means for sensing to generate one or more displacement values by tracking longitude, latitude, and altitude displacement values from the position from which the apparatus observes the access point to the post-observation position fix location.

36. The method of claim 34, said one or more means for sensing to generate one or more displacement values by tracking longitude, latitude, and altitude displacement values from the pre-observation position fix location to the position from which the apparatus observes the access point.

37. An article, comprising: a non-transitory storage medium having stored thereon instructions that, in response to being executed by a processor in a mobile station result in:
determining additional fix information associated with an estimation of a position of a mobile station, wherein said additional fix information comprises one or more measurements obtained from processing one or more wireless signals received at a receiver of the mobile station from one or more base stations;
storing the additional fix information in a memory of the mobile station in a current fix database entry in a fix database based, in part on,
determining a priority value for the current fix database entry,
comparing the priority value for the current fix database entry with priority values for a plurality of previously stored fix database entries, and
storing the current fix database entry according to a priority scheme for the additional fix information; and
transmitting one or more signals representative of at least a subset of the additional fix information into a network.

38. The article of claim 37, wherein the non-transitory storage medium has stored thereon further instructions that, in response to being executed by the processor, result in:
receiving one or more signals representative of updated almanac information from the network, wherein said updated almanac information is based, at least in part, on said subset of additional fix information.

39. The article of claim 38, wherein the non-transitory storage medium has stored thereon further instructions that, in response to being executed by the processor, further result in the mobile station performing one or more operations utilizing at least a portion of the updated almanac information, wherein said one or more operations comprise one or more of:
   determining one or more base stations and/or satellite signals for which the mobile station is to search;
   determining one or more time and/or frequency search windows for satellite and/or terrestrial wireless signals;
   maintaining a background position fix solution in the mobile station at least in part by performing periodic network-based position fixes;
   maintaining a mobile station clock at least in part by performing periodic network-based position and/or time fixes;
   performing a hybrid position fix with one or more varied terrestrial-based measurement types and/or one or more varied satellite-based measurement types;
   performing a fall-back position fix solution if a preferred measurement type search fails to provide a navigation solution; and
   performing a network-based position fix that is sufficiently accurate and/or timely to avoid a need for further satellite and/or terrestrial signals.

40. The article of claim 37, wherein the estimation of the position of the mobile station is based, at least in part, on prior base station almanac information received from the network and stored in the memory of the mobile station.

41. The article of claim 37, wherein said one or more measurements obtained from processing the one or more wireless signals comprise propagation delay information from one or more cells of a cellular network, and wherein the storage medium has stored thereon further instructions that, in response to being executed by the processor, further result in receiving transmitter location information broadcasted by a transmitter and storing said transmitter location information in the memory as additional fix information.

42. The article of claim 37, wherein the non-transitory storage medium has stored thereon further instructions that, in response to being executed by the processor, further result in the mobile station receiving one or more satellite positioning system (SPS) signals from one or more space vehicles, wherein said estimation of the position of the mobile station is based, at least in part, on one or more measurements obtained from processing said one or more SPS signals.

43. The article of claim 37, wherein the non-transitory storage medium has stored thereon further instructions that, in response to being executed by the processor, further result in storing the additional fix information in a cell database in the memory of the mobile station according to the priority scheme.

44. The article of claim 37, wherein the non-transitory storage medium has stored thereon further instructions that, in response to being executed by the processor, further result in storing the additional fix information in the current fix database entry according to the priority scheme by storing the additional fix information according to a first-in, first-out priority scheme, wherein more recent fix database entries are accorded a higher priority value over less recent fix database entries.

45. The article of claim 37, wherein said determining the priority value is based, at least in part, on one or more of:
   an accuracy of the prior base station almanac information;
   distances in space between the current fix database entry and neighboring entries comprising a prior fix database entry and a following fix database entry;
   differences in time between the current fix database entry and the neighboring entries;
   a level of confidence that the prior base station almanac information is provided by a trusted source;
   a level of statistical significance for one or more entries of the prior base station almanac information;
   a level of desire for additional almanac information based at least in part on whether the prior base station almanac information comprises information related to a known coverage area; and
   a determination of whether the prior base station almanac information comprises unknown or unreliable information, and whether additional almanac information is relatively highly desired.

46. An article, comprising a non-transitory storage medium having stored thereon instructions that, in response to being executed by a processor in a mobile station result in:
   determining additional fix information associated with an estimation of a position of a mobile station, wherein said additional fix information comprises one or more measurements obtained from processing one or more wireless signals received at a receiver of the mobile station from one or more base stations;
   storing the additional fix information in a memory of the mobile station according to a priority scheme for the additional fix information;
   transmitting one or more signals representative of at least a subset of the additional fix information into a network; and
   estimating a position of an access point in an area where insufficient wireless signals are available to perform a position fix for the mobile station, wherein the mobile station comprises one or more sensors, the mobile station to estimate the position of the access point at least in part by calculating a position from which the mobile station observes the access point, wherein said calculating is based at least in part on one or more displacement values generated at least in part by the one or more sensors and further based at least in part on a pre-observation and/or a post-observation position fix for the mobile station, the pre-observation position fix to occur at a point in time prior to the mobile station observing the access point and the post-observation position fix to occur at a point in time subsequent to the mobile station observing the access point.

47. The article of claim 46, wherein said one or more displacement values are generated by the one or more sensors tracking longitude, latitude, and altitude displacement values from the position from which the mobile station observes the access point to the post-observation position fix location.

48. The article of claim 46, wherein said one or more displacement values are generated by the one or more sensors tracking longitude, latitude, and altitude displacement values from the pre-observation position fix location to the position from which the mobile station observes the access point.

* * * * *